(12) United States Patent
Feillens et al.

(10) Patent No.: US 6,781,750 B2
(45) Date of Patent: Aug. 24, 2004

(54) METHOD OF AMPLIFYING OPTICAL SIGNALS USING DOPED MATERIALS WITH EXTREMELY BROAD BANDWIDTHS

(75) Inventors: Yannick G. Feillens, Saint Juery (FR); Michel J. F. Digonnet, Palo Alto, CA (US); Martin M. Fejer, Menlo Park, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 112 days.

(21) Appl. No.: 10/282,139

(22) Filed: Oct. 25, 2002

(65) Prior Publication Data

US 2003/0086154 A1 May 8, 2003

Related U.S. Application Data

(62) Division of application No. 09/627,544, filed on Jul. 28, 2000, now Pat. No. 6,490,081.

(51) Int. Cl.[7] .............................................. H01S 3/17
(52) U.S. Cl. ...................... 359/343; 359/341.1; 372/40
(58) Field of Search ............................. 359/343, 341.1, 359/341.5; 372/40; 252/501

(56) References Cited

U.S. PATENT DOCUMENTS

| | | | |
|---|---|---|---|
| 4,560,249 A | 12/1985 | Nishiwaki et al. ......... 350/162.17 |
| 4,962,995 A | 10/1990 | Andrews et al. ............. 350/96.34 |
| 4,965,091 A | 10/1990 | Fratello et al. ................ 427/64 |
| 5,022,041 A | * 6/1991 | Jacobs ........................... 372/70 |
| 5,023,877 A | 6/1991 | Eden et al. ...................... 372/7 |
| 5,036,520 A | 7/1991 | Bowman et al. ............... 372/41 |
| 5,038,353 A | * 8/1991 | Esterowitz et al. ........... 372/41 |
| 5,140,658 A | 8/1992 | Sunshine ....................... 385/49 |
| 5,181,214 A | 1/1993 | Berger et al. ................. 372/34 |
| 5,272,708 A | 12/1993 | Esterowitz et al. ........... 372/20 |
| 5,307,358 A | 4/1994 | Scheps .......................... 372/20 |
| 5,383,200 A | * 1/1995 | Barrett et al. ................. 372/25 |
| 5,495,494 A | 2/1996 | Molva et al. .................. 372/98 |
| 5,535,051 A | 7/1996 | Basiev et al. ................ 359/342 |
| 5,572,725 A | * 11/1996 | Morris et al. ................ 428/555 |
| 5,610,933 A | * 3/1997 | Jani et al. ..................... 372/41 |
| 5,640,408 A | * 6/1997 | Jani et al. ..................... 372/41 |
| 5,675,595 A | * 10/1997 | Jani .............................. 372/23 |
| 5,689,522 A | * 11/1997 | Beach .......................... 372/75 |
| 5,723,964 A | * 3/1998 | Nakaba ....................... 318/599 |
| 5,747,807 A | * 5/1998 | Atkinson et al. ....... 250/339.13 |

(List continued on next page.)

OTHER PUBLICATIONS

Sugizaki et al. "Japanese CELRAP laser fabrication: optimized Czochralski growth conditions and fundamental properties of $Ho^{3+}$ doped $Lu_3Al_5O_{12}$" CLEO/Pacific Rim 2001. Jul. 15–19, 2003. vol. 1.*

(List continued on next page.)

*Primary Examiner*—Thomas G. Black
*Assistant Examiner*—Stephen Cunningham
(74) *Attorney, Agent, or Firm*—Knobbe, Martens, Olson & Bear, LLP

(57) ABSTRACT

In a method of amplifying optical input signals over a wide bandwidth, the optical input signals are applied to an optical waveguide made from a rare-earth-doped amorphous material (e.g., erbium-doped yttrium aluminum oxide material). The optical input signals include optical signals having wavelengths over a range of at least 80 nanometers, and, preferably, over a range of at least 160 nanometers. Pump light is applied to the optical waveguide to cause the waveguide to provide optical gain to the optical input signals. The optical gain causes the optical signals to be amplified within the waveguide to provide amplified optical signals over the extended 80-160-nanometer range, including, in particular, optical signals having wavelengths at one end of the range and optical signals having wavelengths at a second end or the range.

4 Claims, 25 Drawing Sheets

U.S. PATENT DOCUMENTS

| | | | | |
|---|---|---|---|---|
| 5,851,284 A | * | 12/1998 | Ishibashi et al. | 117/35 |
| 5,898,720 A | * | 4/1999 | Yamamoto et al. | 372/39 |
| 5,917,188 A | * | 6/1999 | Atkinson et al. | 250/339.13 |
| 5,936,762 A | | 8/1999 | Samson et al. | 359/341 |
| 6,023,479 A | | 2/2000 | Thony et al. | 372/11 |
| 6,028,310 A | * | 2/2000 | Atkinson et al. | 250/339.13 |
| 6,028,873 A | * | 2/2000 | Yamamoto et al. | 372/39 |
| 6,101,203 A | * | 8/2000 | Yamamoto et al. | 372/39 |
| 6,278,832 B1 | * | 8/2001 | Zagumennyi et al. | 385/141 |
| 6,284,085 B1 | * | 9/2001 | Gwo | 156/273.7 |
| 6,358,441 B2 | * | 3/2002 | Duclos et al. | 264/1.22 |
| 6,490,081 B1 | * | 12/2002 | Feillens et al. | 359/343 |
| 6,548,176 B1 | * | 4/2003 | Gwo | 428/420 |
| 6,587,496 B1 | * | 7/2003 | Murray et al. | 372/70 |
| 6,654,161 B2 | * | 11/2003 | Bass et al. | 359/326 |

OTHER PUBLICATIONS

R. Mazelsky et al., *Crystal Growth of GdAlO₃*, Journal of Crystal Growth 2, No. 4, Jan. 21, 1968, pp. 209–214.

A.A. Kaminskii et al., *Investigation of stimulated emission from $Lu_3Al_5O_{12}$ crystals with $Ho^{3+}$, $Er^{3+}$ and $Tm^{3+}$ ions*, phys. stat. sol. (a), vol. 18, Jun. 4–9, 1973, pp. K31–K34.

Mitsuo Yamaga et al., *Optical Waveguide of Nd–Doped Garnet Thin Film RF–Sputtered on $Y_3Al_5O_{12}$ Substrate*, Department of Information and Computer Sciences, Toyohashi University of Technology, Nov. 16, 1985, pp. 194–199.

J.P. Coutures et al., *Contactless Treatments of Liquids in a Large Temperature Range by an Aerodynamic Levitation Device under Laser Heating*, Proc. 6th European Symposium on Materials under Microgravity Conditions, Bordeaux, France, Dec. 2–5, 1986, pp. 427–430.

G. Huber et al., *Laser Pumping of Ho–, Tm–, Er–Doped Garnet Lasers at Room Temperature*, IEEE Journal of Quantum Electronics, vol. 24, No. 6, Jun. 1988, pp. 920–923.

D.N. Payne et al., *Rare–Earth–Doped Fibre Lasers Amplifiers*, 14$^{th}$ European Conference on Optical Communication, Sep. 15, 1988, pp. 49–53.

J.E. Townsend et al., *$Yb^{3+}$ Sensitised $Er^{3+}$ Doped Silica Optical Fibre with Ultrahigh Transfer Efficiency and Gain*, Electronics Letters, vol. 27, No. 21, Oct. 10, 1991, pp. 1958–1959.

J.F. Massicott et al., *Low noise operation of $Er^{3+}$ doped silica fibre amplifier around 1.6 μm*, Electronics Letters, vol. 28, No. 20, Sep. 24, 1992, pp. 1924–1925.

J. S. Sanghera et al., *Rare earth doped heavy–metal fluoride glass fibers*, in Rare Earth Doped Fiber lasers and Amplifiers, M. J. F. Digonnet, Ed., Marcel Dekker, Inc., N. Y., 1993.

P. F. Wysocki et al., *Evidence and modeling of paired ions and other mechanisms in erbium–doped silica fibers*, in SPIE Proceedings on Fiber Laser Sources and Amplifiers IV, vol. 1789, 1993, pp. 66–79 (printed as pp. 1–14).

J.K. Richard Weber et al., *Enhanced Formation of Calcia–Gallia Glass by Containerless Processing*, J. Am. Ceram. Soc., vol. 76, No. 9, Aug. 1993, pp. 2139–2141.

C. Li et al., *Luminescence Properties of the $Tm^{3+}$ Doped Silicates $Y_2SiO_5$, $CaY_4(SiO_4)_3O$ and $SrY_4(SiO_4)_3O$*, Journal of Luminescence, vol. 2, 1994, pp. 157–171.

C. Borel et al., *Room–temperature CW Laser Efficiency $Yb^{3+}$–$Er^{3+}$ and $Tm^{3+}$ Doped Silicates In the Infrared Region*, Mat. Res. Soc. Symp. Proc., vol. 329, 1994, pp. 253–259.

J.K. Richard Weber et al., *Aero–acoustic levitation–A method for containerless liquid–phase processing at high temperatures*, Rev. Sci. Instrumen., vol. 65, Feb. 1994, pp. 456–465.

J. L. Wagener et al., *Modeling of ion pairs in erbium–doped fiber amplifiers*, Optics Letters, vol. 19, Mar. 5, 1994, pp. 347–349.

J.C. Souriau et al., *Room–temperature diode–pumped continuous–wave $SrY_4(SiO_4)_3O$: $Yb^{3+}$, $Er^{3+}$ crystal laser at 1554 nm*, Appl. Phys. Lett. vol. 64, No. 10, Mar. 7, 1994, pp. 1189–1191.

A. Maurizi et al., *Crystal Growth and Optical Properties of Er:CAS ($Ca_2Al_2SiO_7$) and Er:SLG ($SrLaGa_3O_7$)*, Journal De Physique IV, vol. 4, Apr. 1994, pp. 415–418.

Peter F. Moulton, *Erbium–Laser–Based Infrared Sources*, Schwartz Electro–Optics, Inc., Jun. 1994, 233 pages (including appendices).

J.K.R. Weber et al., *Containerless Liquid–Phase Processing of Ceramic Materials*, Microgravity Sci. Technol., vol. 7, Feb. 1995, pp. 279–282.

B.Simondi–Teisseire et al., *Optical Investigation of Er: $Ca_2Al_2SiO_7$, and Yb: $Ca_2Al_2SiO_7$ for Laser Applications in the Near Infrared*, Phys. Stat. Sol. (a), vol. 155, No. 1, 1996, pp. 249–262.

D.G. Matthews et al., *A Comparative Study of Diode Pumped Microchip Laser Materials: Nd–doped $YVO_4$, YOS, SFAP and SVAP*, Journal of Modern Optics, vol. 43, No. 5, 1996, pp. 1079–1087.

A.M. Lejus et al., *Site Selective Spectroscopy of Nd Ions in Gehlenite ($Ca_2Al_2SiO_7$), A New Laser Material*, Optical Materials, vol. 6, No. 3, 1996, pp. 129–137.

J.K. Richard Weber et al., *Laser hearth melt processing of ceramic materials*, Rev. Sci. Instrum., vol. 67, Feb. 1996, pp. 522–524.

Paul F. Wysocki et al., *Dual–stage erbium–doped, erbium/ytterbium–codoped fiber amplifier with up to +26–dBm output power and a 17–nm flat spectrum*, Optics Letters, vol. 21, Nov. 1, 1996, pp. 1744–1746.

Hirotaka Ono et al., *Gain–flattened $Er^{3+}$ –doped fiber amplifier for a WDM signal in the 1.57–1.60–μm wavelength region*, IEEE Photonics Technology Letters, vol. 9, No. 5, May 1997, pp. 596–598.

Paul C. Nordine et al., *Fiber Drawing from Undercooled Molten Materials*, International Application No. PCT/US97/00466, filed on Jan. 9, 1997, and published on Jul. 17, 1997 as WIPO International Publication No. WO 97/25284.

Shankar Krishnan et al., *Levitation apparatus for structural studies of high temperature liquids using synchrotron radiation*, Rev. Sci. Instrum., vol. 68, Sep. 1997, pp. 3512–3518.

Y. Sun et al., *80 nm ultra–wideband erbium–doped silica fibre amplifier*, Electronics Letters, vol. 33, No. 23, Nov. 6, 1997, pp. 1965–1967.

Yasutake Ohishi et al., *Optical fiber amplifiers for WDM transmission*, NTT Review, vol. 10, No. 1, Jan. 1998, pp. 45–51.

Yasutaka Ohishi et al., *Gain characteristics of telluritebased erbium–doped fiber amplifiers for 1.5–μm broadband amplification*, Optics Letters, vol. 23, No. 4, Feb. 15, 1998, pp. 274–276.

J. K. Richard Weber et al., *Glass fibers of pure and erbium or neodymium–doped yttria–alumina compositions*, Nature, vol. 393, Jun. 1998, pp. 769–771.

Juhan Lee et al., *Enhancement of power conversion efficiency for an L–band EDFA with a secondary pumping effect in the unpumped EDF section,* IEEE Photonics Technology Letters, vol. 11, No. 1, Jan. 1999, pp. 42–44.

Shingo Kawai et al., *Wide bandwidth and long distance WDM transmission using highly gain–flattened hybrid amplifier,* Proceedings of Optical Fiber Communication OFC'99, Paper FC3, Feb. 26, 1999, pp. 56–58.

PCT International Search Report, mailed Apr. 4, 2001, in International Application No. PCT/US00/20758.

PCT International Search Report, mailed Apr. 5, 2001, in corresponding International Application No. PCT/US00/20578.

* cited by examiner-

METHOD OF AMPLIFYING OPTICAL SIGNALS USING DOPED MATERIALS WITH EXTREMELY BROAD BANDWIDTHS

RELATED APPLICATION

The present application is a divisional application of U.S. patent application Ser. No. 09/627,544 filed on Jul. 28, 2000 and now U.S. Pat. No. 6,490,081 the entire contents of which are incorporated by reference herein.

BACKGROUND OF THE INVENTION

1. Field of the Invention

The present invention relates to the field of optical amplifiers, and, more particularly, relates to the field of optical amplifiers comprising a length of optical fiber having an active dopant which fluoresces in response to pump light.

2. Description of the Related Art

Erbium-doped fiber amplifiers (EDFAs) are used extensively in commercial optical communication systems, both as all-optical repeaters and pre-amplifiers. After traveling through long lengths of communication fiber (typically several tens of kilometers), the information-encoded signals are strongly attenuated by fiber loss, and it is the role of the erbium-doped fiber amplifier (EDFA) to amplify the signals to a reasonable power level. EDFAs have now reached the point where they have been optimized with respect to their energy efficiency to minimize their requirement for pump power (which is costly). EDFAs have further been optimized with respect to their noise performance such that noise figures approaching the best-case theoretical limit of 3 dB are now possible. The gain flatness of optimized EDFAs now exceeds a few tens of dB over tens of nanometers of bandwidth. EDFAs can now be designed so that their gain depends very little on the polarization of the input signals.

One area of EDFA research that is still very active is the gain bandwidth. The gain bandwidth parameter is important because it ultimately dictates the number of signals of different wavelengths that can be amplified by a given EDFA. The broader the bandwidth is, the larger the number of individual signals that can be amplified, and therefore the higher the bandwidth (bits of information per unit time) that can be carried by a single fiber. Because the host affects the spectroscopy of the erbium ions, a number of fiber host materials, including silica, fluorozirconate glasses, and chalcogenides, have been and continue to be investigated in an attempt to identify a host that will provide a larger gain bandwidth for the $^4I_{13/2} \rightarrow {}^4I_{15/2}$ transition of $Er^{3+}$. In silica-based glasses, the bandwidth is generally divided into what are known as the C-band and the L-band. In approximate terms, the C-band is the portion of the optical spectrum below about 1,565 nanometers, while the so-called L-band is the portion of the optical spectrum above about 1,565 nanometers. In silica-based fibers, the total bandwidth of the combined C and L-bands is approximately 80 nanometers, although this figure has only been attained so far by concatenating two EDFAs. (See, for example, Y. Sun, et al., *80 nm ultra-wideband erbium-doped silica fibre amplifier*, Electronics Letters, Vol. 33, No. 23, November 1997, pp. 1965–1967.) The situation is similar with a fluorozirconate host. (See, for example, S. Kawai, et al., *Wide bandwidth and long distance WDM transmission using highly gain-flattened hybrid amplifier*, Proceedings of Optical Fiber Communication OFC'99, Paper FC3, February 1999, pp. 56–58.) In tellurite glass fibers, the total bandwidth is also around 80 nanometers, but it can be accomplished with a single fiber. (See, for example, Y. Ohishi, et al., *Optical fiber amplifiers for WDM transmission*, NTT R & D, Vol. 46, No. 7, pp. 693–698, 1997; and Y. Ohishi, et al., *Gain characteristics of tellurite-based erbium-doped fiber amplifiers for 1.5-μm broadband amplification*, Optics Letters, Vol. 23, No. 4, February 1998, pp. 274–276.

FIG. 1 illustrates an exemplary standard EDFA configuration 100 comprising an erbium-doped fiber (EDF) 110. Optical signals are input to the erbium-doped fiber 110 via a first optical isolator 120 and a wavelength division multiplexing (WDM) coupler 122. An optical pump signal from an optical pump source 124 is also input to the erbium-doped optical fiber 110 via the WDM coupler 122. The amplified output signals from erbium-doped optical fiber 110 are output through a second optical isolator 126. The optical isolators 126, 120 are included to eliminate backward reflections into the erbium-doped fiber 110 from the output port and to eliminate backward reflections from the erbium-doped fiber 110 to the input port, respectively. The erbium-doped optical fiber 110 can be pumped in the forward direction, as illustrated in FIG. 1, or in the backward direction (not shown) or in both directions. Because of the broad nature of the fiber gain medium, the configuration of FIG. 1 produces gain over a large bandwidth. For example, erbium-doped tellurite fibers and erbium-doped chalcogenide fibers have been used in the configuration of FIG. 1. As set forth in Y. Ohishi, et al., *Gain characteristics of tellurite-based erbium-doped fiber amplifiers for 1.5-μm broadband amplification*, Optics Letters, Vol. 23, No. 4, February 1998, pp. 274–276, gain bandwidths of around 80 nanometers have been produced using a tellurite fiber.

When the fiber host is a silica-based glass, gain cannot be provided over the whole bandwidth (approximately 1,525 nanometers to approximately 1,610 nanometers) with a single fiber. Instead, gain needs to be produced over two adjacent spectral regions, and then the outputs resulting from the gain are combined. A generic method for achieving broader gain bandwidth is to use hybrid amplifiers, in which two or more amplifiers made of different hosts are concatenated. The amplifiers are designed such that they provide gain spectra that complement each other, thus producing a larger overall gain bandwidth than either one of them. This method was successfully demonstrated with a silica-based EDFA followed by a fluoride-based EDFA, which produced a 0.5-dB-bandwidth of 17 nanometers. (See, P. F. Wysocki, et al., *Dual-stage erbium-doped, erbium/ytterbium-codoped fiber amplifier with up to +26-dBm output power and a 17-nm flat spectrum*, Optics Letters, Vol. 21, November 1996, pp. 1744–1746.) More recently, a similar concept was applied to two fluoride-based EDFAs. (See, Y. Sun, et al., *80 nm ultra-wideband erbium-doped silica fibre amplifier*, Electronics Letters, Vol. 33, No. 23, November 1997, pp. 1965–1967.)

FIG. 2 illustrates an exemplary configuration 200 having two EDFAs 210, 220. One EDFA (the lower EDFA 210) is designed to amplify the C-band (from approximately 1,525 nanometers to approximately 1,565 nanometers), and the other EDFA (the upper EDFA 220) is designed to amplify the L-band (approximately 1,565 nanometers to approximately 1,620 nanometers). The two EDFAs 210, 220 advantageously include respective pump sources (not shown) which are coupled to the erbium-doped fibers using respective WDM couplers, as illustrated in FIG. 1. The input signals, which have different wavelengths $\lambda_i$ spaced apart by a certain amount, are split into the two branches with a WDM coupler 230 and the amplified output signals are combined in an output coupler 232. An input optical isolator 240 and an output optical isolator 242 operate as described above. Because of the WDM coupler 230, signals with wavelengths less than approximately 1,565 nanometers are coupled into the lower branch to propagate to the C-band EDFA 210, and signals with wavelengths greater than approximately 1,565 nanometers are coupled into the upper branch to propagate to the L-band EDFA 220. (In practice, there is a narrow guard band between the C-band and the L-band to avoid overlapping signals in the two arms.) For example, a silica-based EDFA can be designed to have an L-band with a gain spectrum that is flat within 0.5 dB over the 1,568-nanometer to 1,602-nanometer range. The gain flatness is partly achieved, for example, by selecting the proper fiber length or with the use of filters. Both methods are well known in the art.

The C-band EDFA 210 and the L-band EDFA 220 can be made from the same erbium-doped fiber, or of different fibers, or of different host materials. The C-band and L-band EDFAs 210, 220 may differ in their respective designs, particularly with respect to pump wavelength, pump configuration and fiber length.

Generally, the upper limit of the L-band EDFA 220 is approximately 1,610 nanometers. There is a substantial effort in the research community to push this limit by adjusting the host material. The difficulty in further extending this limit resides in the presence of signal excited-state absorption (ESA) above around 1,620 nanometers for tellurite glass and above around 1,610 nanometers for silica glass. The ESA constitutes an undesirable signal loss mechanism. Based on these results, the current bandwidth record for silica-based (Y. Sun, et al., cited above) and fluoride-based EDFAs (S. Kawai, et al., cited above) is around 80–85 nanometers (i.e., similar to that of tellurite-based EDFAs as disclosed in the two Y. Ohishi, et al., articles cited above).

SUMMARY OF THE PRESENT INVENTION

One aspect of the present invention is a method for amplifying optical input signals over an extended optical bandwidth. The method comprises inputting the optical input signals to an optical waveguide comprising an amorphous $Y_2SiO_5$ material doped with a rare earth. The optical input signals include at least a first optical signal having a first wavelength and at least a second optical signal having a second wavelength, wherein the second wavelength is greater than the first wavelength. The method includes applying pump light to the optical waveguide to cause the waveguide to provide optical gain to the optical input signals such that at least the first optical signal and the second optical signal are amplified.

In one embodiment of the method, the amorphous material is $Y_2SiO_5$ doped with erbium, and the second wavelength is approximately 160 nanometers greater than the first wavelength. Alternatively, the amorphous $Y_2SiO_5$ material is doped with erbium and ytterbium.

In a second embodiment of the method, the amorphous material is $Lu_3Al_5O_{12}$, and the second wavelength is approximately 160 nanometers greater than the first wavelength.

In a third embodiment of the method, the amorphous material is $Y_3Ga_5O_{12}$, and the second wavelength is approximately 140 nanometers greater than the first wavelength.

In a fourth embodiment of the method, the amorphous material is $Ca_2Al_2SiO_7$, and the second wavelength is approximately 130 nanometers greater than the first wavelength.

In a fifth embodiment of the method, the amorphous material is $Y_3Sc_2Ga_3O_{12}$, and the second wavelength is approximately 130 nanometers greater than the first wavelength. Alternatively, the amorphous $Y_3Sc_2Ga_3O_{12}$ material is doped with erbium and ytterbium. In a further alternative, the amorphous $Y_3Sc_2Ga_3O_{12}$ material is doped with erbium and chromium.

In a sixth embodiment of the method, the amorphous material is $Bi_4Ge_3O_{12}$, and the second wavelength is approximately 125 nanometers greater than the first wavelength.

In a seventh embodiment of the method, the amorphous material is $GdAlO_3$, and the second wavelength is approximately 125 nanometers greater than the first wavelength.

In an eighth embodiment of the method, the amorphous material is $SrY_4(SiO_4)_3O$, and the second wavelength is approximately 125 nanometers greater than the first wavelength.

In a ninth embodiment of the method, the amorphous material is $LiYF_4$, and the second wavelength is approximately 110 nanometers greater than the first wavelength.

In a tenth embodiment of the method, the amorphous material is $CaF_2$—$YF_3$, and the second wavelength is approximately 110 nanometers greater than the first wavelength.

In an eleventh embodiment of the method, the amorphous material is $YVO_4$, and the second wavelength is approximately 90 nanometers greater than the first wavelength.

In a twelfth embodiment of the method, the amorphous material is $LiErYP_4O_{12}$, and the second wavelength is approximately 80 nanometers greater than the first wavelength.

Another aspect of the present invention is an optical amplifier which amplifies optical input signals over an extended optical bandwidth. The optical amplifier comprises an optical pump source which provides optical pump light, and an optical waveguide which comprises an amorphous material doped with a rare earth. The optical waveguide is optically coupled to receive the optical pump light from the optical pump source. The optical waveguide receives optical input signals having a plurality of wavelengths. The optical input signals include at least a first optical signal having a first wavelength and at least a second optical signal having a second wavelength greater than the first wavelength. The pump light has a pump wavelength and intensity at the pump wavelength which causes the optical waveguide to provide optical gain such that at least the first optical signal and the second optical signal are amplified.

In one embodiment of the apparatus, the amorphous material is $Y_2SiO_5$ doped with erbium, and the second wavelength is approximately 160 nanometers greater than the first wavelength. Alternatively, the amorphous $Y_2SiO_5$ material is doped with erbium and ytterbium.

In a second embodiment of the apparatus, the amorphous material is $Lu_3Al_5O_{12}$, and the second wavelength is approximately 160 nanometers greater than the first wavelength.

In a third embodiment of the apparatus, the amorphous material is $Y_3Ga_5O_{12}$, and the second wavelength is approximately 140 nanometers greater than the first wavelength.

In a fourth embodiment of the apparatus, the amorphous material is $Ca_2Al_2SiO_7$, and the second wavelength is approximately 130 nanometers greater than the first wavelength.

In a fifth embodiment of the apparatus, the amorphous material is $Y_3Sc_2Ga_3O_{12}$, and the second wavelength is approximately 130 nanometers greater than the first wavelength. Alternatively, the amorphous $Y_3Sc_2Ga_3O_{12}$ material is doped with erbium and ytterbium. In a further alternative, the amorphous $Y_3Sc_2Ga_3O_{12}$ material is doped with erbium and chromium.

In a sixth embodiment of the apparatus, the amorphous material is $Bi_4Ge_3O_{12}$, and the second wavelength is approximately 125 nanometers greater than the first wavelength.

In a seventh embodiment of the apparatus, the amorphous material is $GdAlO_3$, and the second wavelength is approximately 125 nanometers greater than the first wavelength.

In an eighth embodiment of the apparatus, the amorphous material is $SrY_4(SiO_4)_3O$, and the second wavelength is approximately 125 nanometers greater than the first wavelength.

In a ninth embodiment of the apparatus, the amorphous material is $LiYF_4$, and the second wavelength is approximately 110 nanometers greater than the first wavelength.

In a tenth embodiment of the apparatus, the amorphous material is $CaF_2$—$YF_3$, and the second wavelength is approximately 110 nanometers greater than the first wavelength.

In an eleventh embodiment of the apparatus, the amorphous material is $YVO_4$, and the second wavelength is approximately 90 nanometers greater than the first wavelength.

In a twelfth embodiment of the apparatus, the amorphous material is $LiErYP_4O_{12}$, and the second wavelength is approximately 80 nanometers greater than the first wavelength.

BRIEF DESCRIPTION OF THE DRAWINGS

These and other aspect of the present invention will be described below in connection with the drawings, in which:

FIGS. 16–23 are reproductions of drawings from International Application No. PCT/US97/00466, filed on Jan. 9, 1997, and published on Jul. 17, 1997 as International Publication No. WO 97/25284, which drawings and description are included herein to illustrate a method for making a fiber to use in implementing the present invention, and in which:

FIG. 16 illustrates a schematic diagram of an embodiment of a fiber stinger-drawing system in accordance with a method of making a fiber;

FIG. 17 illustrates an embodiment of a method in accordance with the principles of WO 97/25284 for drawing fibers in opposite directions from an undercooled and levitated melt;

FIG. 18 illustrates an embodiment of a method in accordance with the principles of WO 97/25284 for drawing fibers from an undercooled melt maintained in a conical nozzle levitator;

FIG. 19 illustrates a diagram illustrating a typical cooling curve for a 0.3 cm diameter mullite specimen which was levitated and melted in an aero-acoustic levitator;

FIG. 20 illustrates a typical alumina-silica phase diagram;

FIG. 21 illustrates an embodiment of a method for drawing fibers from an undercooled melt maintained in a non-isothermal container;

FIG. 22 illustrates a portion of atypical alumina-silica phase diagram showing the behavior of mullite near the melting temperature; and FIG. 23 illustrates a graph depicting typical tensile testing results for mullite-composition glass fibers.

DETAILED DESCRIPTION OF THE PREFERRED EMBODIMENTS

Figure 1:
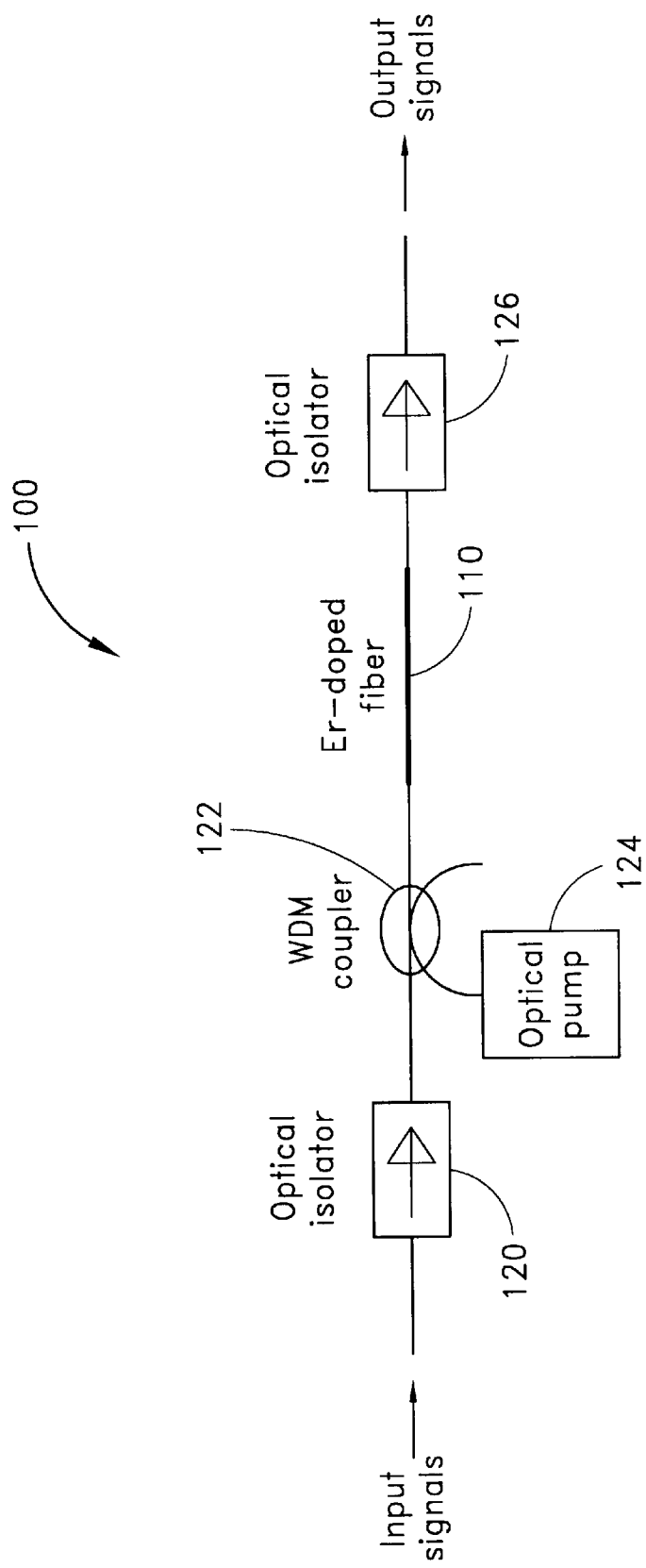
FIG. 1 illustrates an exemplary standard EDFA configuration comprising an erbium-doped fiber.

The present invention is directed to a method of amplifying optical signals over a broader gain bandwidth. The method depends in part upon using an optical fiber with a broader fluorescent bandwidth. In particular, Containerless Research, Inc. (CRI) has recently developed a process to make fibers and small bulk samples from materials which form nearly inviscid liquids at the equilibrium melting point of the solid. (See, J. K. R. Weber, et al., *Glass fibers of pure and erbium or neodymium-doped yttria-alumina compositions, Nature,* Vol. 393, 1998, pp. 769–771; and Paul C. Nordine, et al., *Fiber Drawing from Undercooled Molten Materials,* WIPO International Publication No. WO 97/25284, published on Jul. 17, 1997.) WIPO International Publication No. WO 97/25284 is incorporated by reference herein. The detailed description from International Publication No. WO 97/25284 is set forth as part of the disclosure of the present application.

The process involves completely melting a solid to form a liquid of uniform composition at, or somewhat above, the equilibrium melting point of the crystalline material. In order to achieve the viscosity required to support fiber pulling, the liquid is undercooled (i.e., cooled below its equilibrium melting point). The use of undercooling to achieve increased viscosity is an essential step in the process. Glass fibers are then pulled from the viscous, undercooled liquid.

One embodiment of this fiber synthesis method uses containerless processing techniques which avoid heterogeneous nucleation by contact with solid container walls and allow deep undercooling to a temperature below the melting point of the crystalline precursor material. The containerless processing techniques eliminate chemical contamination of the liquid by contact to an external object (such as a crucible). They can also be used to synthesize glass spheroids 2–3 millimeters in diameter from a variety of oxide materials. (See, for example, J. K. R. Weber, et al., *Enhanced Formation of Calcia-Gallia Glass by Containerless Processing, J. Am. Ceram. Soc.* Vol. 76, No. 9, 1993, pp. 2139–2141; and J. K. R. Weber, et al., *Aero-acoustic levitation—A method for containerless liquid-phase processing at high temperatures, Rev. Sci. Instrumen.,* Vol. 65, 1994, pp. 456–465.) The new fiber fabrication process has been applied to a variety of oxide materials that contain neither silicon dioxide (silica) nor any of the other "network" formers that are typical components of the glass fibers made by conventional fiber fabrication techniques. This process allows the generation of fibers typically 10 to 30 microns in diameter and up to a meter in length.

One of the prototypical materials made available by this process is glass of the $Y_3Al_5O_{12}$ composition. The materials discussed in this application are modifications of this composition formed by substituting lanthanum (La), ytterbium (Yb) and/or erbium (Er) for yttrium (Y) atoms in the material. These materials were synthesized from weighed mixtures of the pure oxides, $Y_2O_3$, $Al_2O_3$, $La_2O_3$, $Yb_2O_3$, and $Er_2O_3$, prepared with weighing errors of approximately 0.5 milligram in each component in a total mass of approximately 0.5 gram. The pure component oxides were 99.999% purity, less than 325 mesh powders, and are available from Cerac, of Milwaukee, Wis. For a composition containing 0.5 mole % or less of $Er_2O_3$, a 9:1 $Yb_2O_3$:$Er_2O_3$ "master alloy" is used to allow easier weighing of the dopant. The mixtures of these component oxides are melted in a laser hearth melter, first to fuse and homogenize the 0.5-gram sample, then to obtain approximately 3-millimeter spheroids by remelting pieces broken from the fused mass. (See, for example, J. K. R. Weber, et al., *Laser hearth melt processing of ceramic materials, Rev. Sci. Instrum.,* Vol. 67, 1996, pp. 522–524.) The spheroids are then levitated and melted by laser beam heating in an aero-acoustic levitator (as described, for example, in J. K. R. Weber, et al., *Aero-acoustic levitation—A method for containerless liquid-phase processing at high temperatures, Rev. Sci. Instrumen.,* Vol. 65, 1994, pp. 456–465) or in a conical nozzle levitator (as described, for example, in J. P. Coutures, et al., *Contactless Treatments of Liquids in a Large Temperature Range by an Aerodynamic Levitation Device under Laser Heating, Proc. 6th European Symposium on Materials under Microgravity Conditions,* Bordeaux, France, Dec. 2–5, 1986, pp. 427–30; and in J. K. R. Weber, et al., *Containerless Liquid-Phase Processing of Ceramic Materials, Microgravity Sci. Technol.,* Vol. 7, 1995, pp. 279–282; and S. Krishnan, et al., *Levitation apparatus for structural studies of high temperature liquids using synchrotron radiation, Rev. Sci. Instrum.,* Vol. 68, 1997, pp. 3512–3518).

Glass spheroids are prepared by turning the heating laser beam power off to allow rapid cooling of the liquid sample to room temperature under containerless conditions. Glass fibers are prepared by reducing the heating laser power until the liquid temperature is in the range from 1,600° K–1,700° K, where the liquid viscosity is sufficient to allow fiber pulling operations. A tungsten stinger wire is then rapidly inserted into the melt and withdrawn at a constant rate of approximately 100 centimeters/second to pull the fibers from the melt. Portions of the process described above are described in Paul C. Nordine, et al., *Fiber Drawing from Undercooled Molten Materials,* WIPO International Publication No. WO 97/25284, published on Jul. 17, 1997, a portion of which is disclosed herein.

The crystalline form of pure $Y_3Al_5O_{12}$ is known as yttrium aluminum garnet, or YAG for short. As used herein, "YAG" refers to this crystalline material. YAG doped with neodymium ions ($Nd^{3+}$) was one of the earliest and most successful laser materials to be demonstrated. Neodymium-YAG (Nd:YAG) lasers have been available commercially for more than 25 years, and they continue to be one of the most efficient, highest power, and most widely used lasers. In contrast, the amorphous fibers of $Y_3Al_5O_{12}$ composition discussed herein will be referred to as amorphous YAG, and the lanthanum-substituted $Y_3Al_5O_{12}$ fibers will be referred to as amorphous lanthanum substituted (or La-substituted) YAG fibers.

There are two principal differences between YAG and the materials discussed herein. First, the materials described herein differ because they are amorphous glass materials in contrast to YAG, which is a crystalline material. Second, the materials discussed herein have lanthanum (La) atoms, ytterbium (Yb) atoms, and/or erbium (Er) atoms substituted for some of the yttrium (Y) atoms in the $Y_3Al_5O_{12}$ composition. The material discussed herein will be referred to as erbium-doped amorphous YAG, ytterbium-doped amorphous YAG, amorphous lanthanum-substituted YAG or amorphous YAG. This nomenclature derives from different purposes for the erbium atom, the ytterbium atom, and the lanthanum atom substitutions for yttrium atoms. The erbium atoms and the ytterbium atoms are optically active dopants substituted into the host glass material.

The elements yttrium, lanthanum, erbium, and ytterbium are members of the "rare earth" family of elements, i.e., the elements with atomic numbers 21, 39, and 57 through 71. The rare earth elements typically have a +3 valence, although some of the rare earth elements, in particular ytterbium, also exhibit a +2 valence. The general chemical formula for all of the materials synthesized in this disclosure can be written $RE_3Al_5O_{12}$, where the subscript "3" on "RE" designates the total content of Y, La, Er, and Yb. The glass spheroids and the fibers containing lanthanum and/or erbium are fabricated in air, in pure argon gas, or in pure oxygen gas. Although described herein with respect to foregoing rare earth elements, it is contemplated that other rare earth materials can also be used.

The chemical compositions of the amorphous YAG composition materials synthesized with lanthanum, erbium, and ytterbium atoms substituted for yttrium atoms are set forth below in Table I:

TABLE 1

| Chemical composition, mole % | | | | | Glass materials formed | |
|---|---|---|---|---|---|---|
| $Al_2O_3$ | $Y_2O_3$ | $La_2O_3$ | $Er_2O_3$ | $Yb_2O_3$ | Fibers | Spheroids |
| 62.5 | 37.5 | 0 | 0 | 0 | x | x |
| 62.5 | 37.49 | 0 | 0.01 | 0 | x | |
| 62.5 | 37.45 | 0 | 0.05 | 0 | x | x |
| 62.5 | 37.4 | 0 | 0.1 | 0 | x | x |
| 62.5 | 37.2 | 0 | 0.3 | 0 | x | x |
| 62.5 | 37.0 | 0 | 0.5 | 0 | x | x |
| 62.5 | 36.5 | 0 | 1.0 | 0 | x | x |
| 62.5 | 35.5 | 0 | 2.0 | 0 | x | x |
| 62.5 | 32.5 | 0 | 5.0 | 0 | x | x |
| 62.5 | 29.5 | 0 | 8.0 | 0 | x | x |
| 62.5 | 12.5 | 12.5 | 12.5 | 0 | x | x |
| 62.5 | 17.75 | 17.75 | 2.0 | 0 | x | x |
| 62.5 | 17.75 | 11.75 | 8.0 | 0 | x | x |
| 62.5 | 32.0 | 0 | 0.5 | 5.0 | | x |

One of the most appealing features of the doped and substituted amorphous YAG material is that they can be doped with a very high concentration of $Er^{3+}$, $Yb^{3+}$, or other rare earth ions. The maximum concentration that can be achieved in a glass depends on the solubility of $Er_2O_3$ in this glass. If too high a concentration of a rare earth oxide is placed in a glass melt and the solubility is exceeded, crystalline oxide particles precipitate in the host. These crystalline particles are generally detrimental to the laser and amplifier properties of the material. A second phenomenon that limits the concentration of dopants in some materials, in particular silica-based glasses, is the formation of clusters of dissolved dopant ions in the host material, which can occur at concentrations less than required to precipitate the oxide particles.

Unlike the erbium ions that are uniformly distributed in the host, clustered erbium ions are subject to a deleterious process known as cross-relaxation. (See, for example, J. L. Wagener, et al., *Modeling of ion pairs in erbium-doped fiber amplifiers, Optics Letters,* Vol. 19, March 1994, pp. 347–349.) By this process, when two ions are optically excited to their metastable (laser) state one of the ions rapidly loses its energy to the other ion, which results in an undesirable loss of population inversion and a drastic reduction in optical gain. In silica-based glasses, the maximum erbium concentration that can be used before this effect becomes noticeable is around 100 parts per million (ppm) mole $Er_2O_3$. To avoid this effect, most silica-based fiber lasers and amplifiers utilize less than 500 ppm mole $Er_2O_3$. This figure is substantially higher in fluoride-based fibers, where concentrations of a few thousand ppm are acceptable. (See, for example, J. S. Sanghera, et al., *Rare earth doped heavy-metal fluoride glass fibers,* in *Rare Earth Doped Fiber lasers and Amplifiers,* M. J. F. Digonnet, Ed., Marcel Dekker, Inc., N.Y., 1993.) In tellurite fibers, the figure is of the order of thousands of ppm, i.e., several tenths of one mole percent. (See, for example, Y. Ohishi, et al., *Gain characteristics of tellurite-based erbium-doped fiber amplifiers for 1.5-μm broadband amplification, Optics Letters,* Vol. 23, No. 4, February 1998, pp. 274–276.) The main consequence of these concentration limits is that only so many ions per unit length can be incorporated in a fiber, and a long length of fiber is required to make a useful device, which is costly and bulky. For example, a typical silica-based EDFA requires a doped fiber length of tens of meters.

An initial experimental study of the spectroscopic properties of new glass materials doped with $Er^{3+}$ has been performed. One objective of the studies was to characterize a few basic optical properties of these materials, either in a spheroid or fiber form. In particular, the study was directed to the absorption and emission cross-sections of the materials, to whether clusters (and cross-relaxation) were present and at what concentrations, and to the bandwidth of the fluorescence spectrum (which reflects the gain bandwidth of the material).

For the purpose of optical characterization, short lengths of erbium-doped amorphous YAG fibers are inserted into capillary tubes, then bonded with a UV-curing epoxy, and then end polished. Typically, four to five fibers of the same host and erbium concentration are mounted in the same capillary. Several capillaries are prepared-one for each of several concentrations (0.5, 1, 2, 5, and 8 mole % $Er_2O_3$). The fibers are unclad. The external diameters of the fibers range from approximately 30 microns to approximately 15 microns or smaller, and the lengths of the fibers after polishing are either approximately 5 millimeters or approximately 10 millimeters. Two new oxide glass host compositions have been tested namely amorphous YAG ($Y_3Al_5O_{12}$, with the Er substituted for Y) and amorphous lanthanum-substituted YAG fibers in which 50% of the yttrium was substituted by lanthanum, ($La_{1.5}Y_{1.5}Al_5O_{12}$, with the Er substituted for La and Y). For all measurements, the fibers are pumped with up to 50 milliwatts of 980-nanometer optical power from a commercially available fiber-pigtailed laser diode.

Fiber absorption measurements are carried out by measuring the ratio of output to input pump power, then assuming 100% coupling of the pump into the fiber and correcting for Fresnel reflection (approximately 8.3%) at each fiber end. The Fresnel reflection is calculated assuming that the index of refraction of the material is the same as that of crystalline YAG, which is around 1.8 at these wavelengths. From these data, the absorption coefficient $\alpha_a$ was inferred, as well as the absorption cross-section $\sigma_a = \alpha_a/N_0$, where $N_0$ is the erbium concentration in the fiber. The mean value observed in several samples of two different concentrations is $\sigma_a = 2.4 \times 10^{-21}$ cm$^2$. It compares favorably with the typical value of $2.2 \times 10^{-21}$ cm$^2$ for erbium-doped silica fibers.

Figure 3:
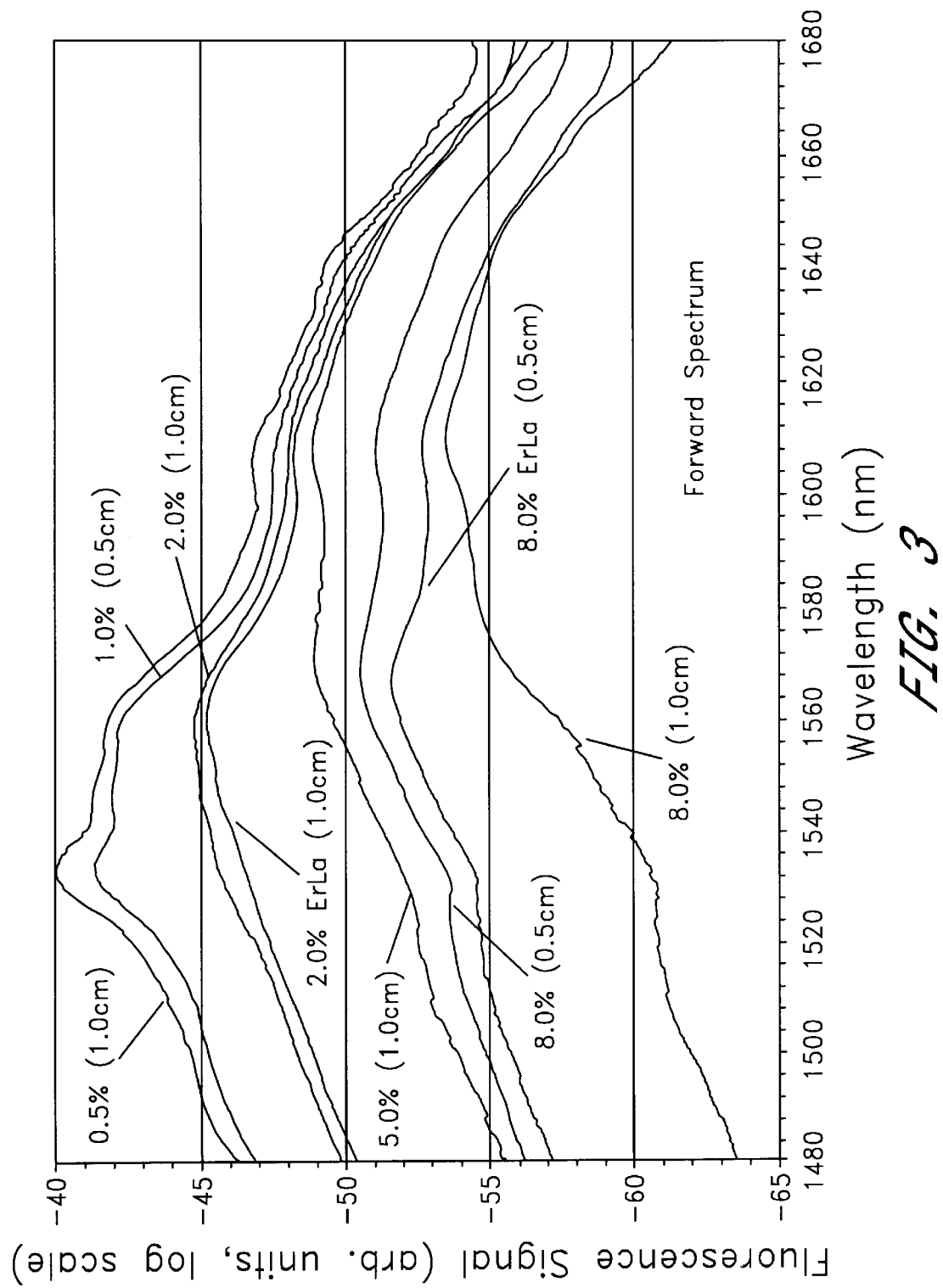
FIG. 3 illustrates the forward fluorescence spectra measured in amorphous YAG fibers and in amorphous lanthanum-substituted YAG fibers doped with various concentrations of erbium, and pumped with approximately 45 milliwatts at 980 nanometers.

FIG. 3 shows fluorescence spectra measured in amorphous YAG fibers and in amorphous lanthanum-substituted YAG fibers 0.5 centimeter to 1.0 centimeter long and approximately 30 microns in diameter, doped with various concentrations of erbium, and pumped with approximately 45 milliwatts at 980 nanometers. These spectra are measured in the forward direction, i.e., the spectra represent fluorescence emitted in the same direction as the direction of propagation of the pump along the fiber. All spectra are broad and free of the finer transition lines typical of erbium-doped crystals. This observation confirms the results of X-ray diffraction analysis, which shows that fibers pulled from undercooled liquid with the YAG-composition are amorphous. (See, for example, J. K. R. Weber, et al., *Glass fibers of pure and erbium or neodymium-doped yttria-alumina compositions, Nature,* Vol. 393, 1998, pp. 769–771.) In fibers with low erbium concentrations, the spectra exhibit features typical of low-power fluorescence spectra of $Er^{3+}$ in other oxide glasses-namely a peak around 1,530 nanometers and a flat shoulder around 1,550 nanometers. At higher concentrations, these features become less pronounced and the spectrum shifts towards longer wavelengths because the pump power is not sufficient to excite all erbium ions, and ground-state absorption filters out the 1,530–1,550 nanometer band (the C-band). In these fibers, the L-band (wavelengths greater than about 1,565 nanometers) is consequently more prominent. The L-band of this material is extremely broad. In the 1-centimeter, 8%-doped fiber, the L-band extends as far as 1,653 nanometers. The 3-dB fluorescence bandwidth has been observed to be as much as 116 nanometers in a 1-centimeter, 5%-doped amorphous YAG fiber. This is far higher than any previously reported bandwidth for this erbium transition in any host. As a point of comparison, in a standard erbium-doped silica-based fiber at 1,650 nanometers, the fluorescence power is typically down 50 dB from what it is at the 1,530-nanometer peak. In contrast, in the amorphous YAG fibers in accordance with the present invention, the fluorescence power drops by only about 12 dB (see FIG. 3). This can be interpreted as a fluorescence spectrum that extends in the range of 20 nanometers to 40 nanometers further towards longer wavelengths than erbium-doped silica-based fibers.

Figure 4:
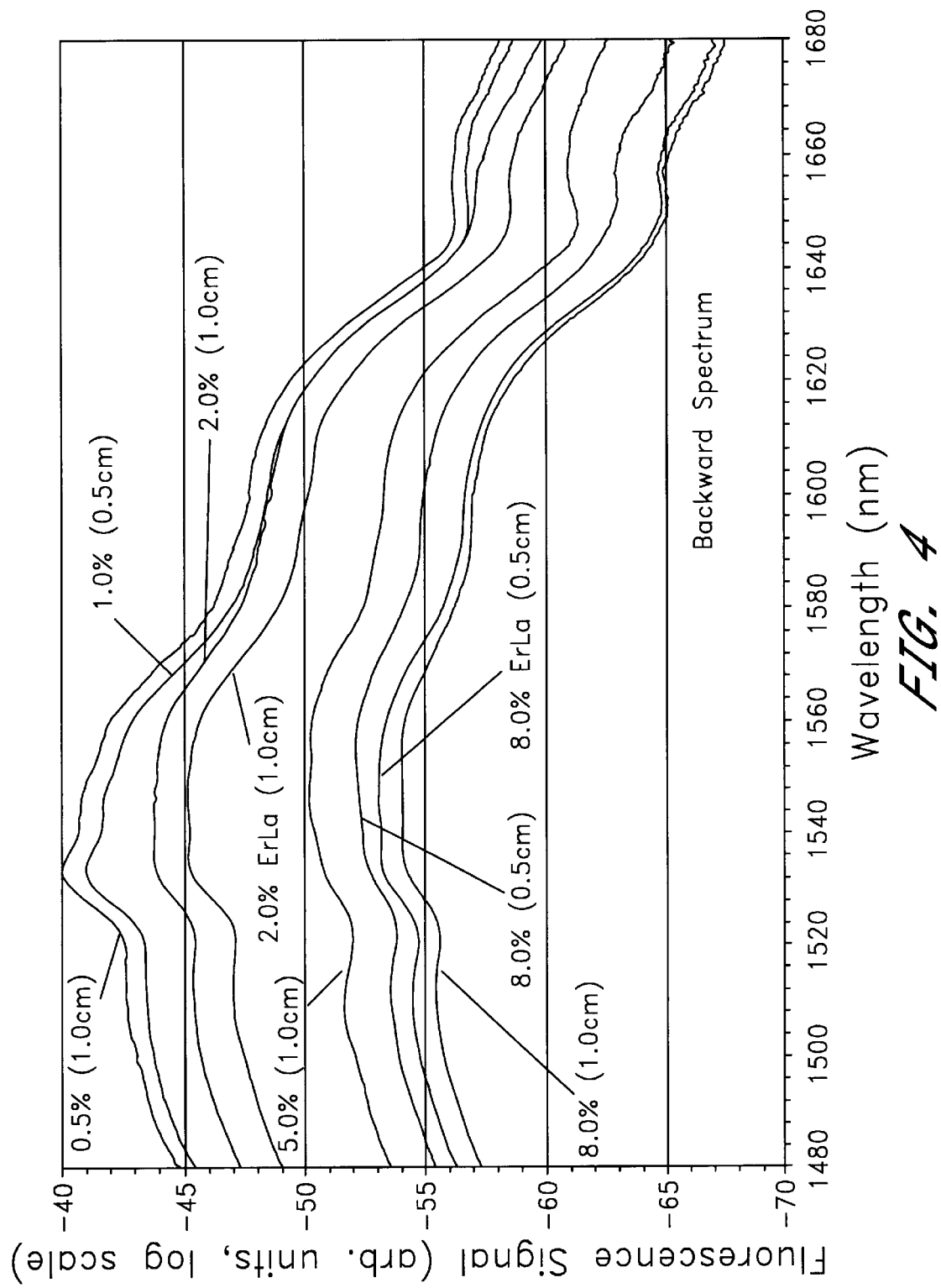
FIG. 4 illustrates the measured backward fluorescence spectra of the amorphous YAG fibers and the amorphous lanthanum-substituted YAG fibers.

The backward fluorescence spectra, shown in FIG. 4, exhibit mostly the C-band features, as expected, but here again the spectrum is very wide. The highest 3-dB bandwidth observed for the backward spectrum is 121 nanometers, in a 0.5-centimeter, 8%-doped YAG fiber.

Figure 5:
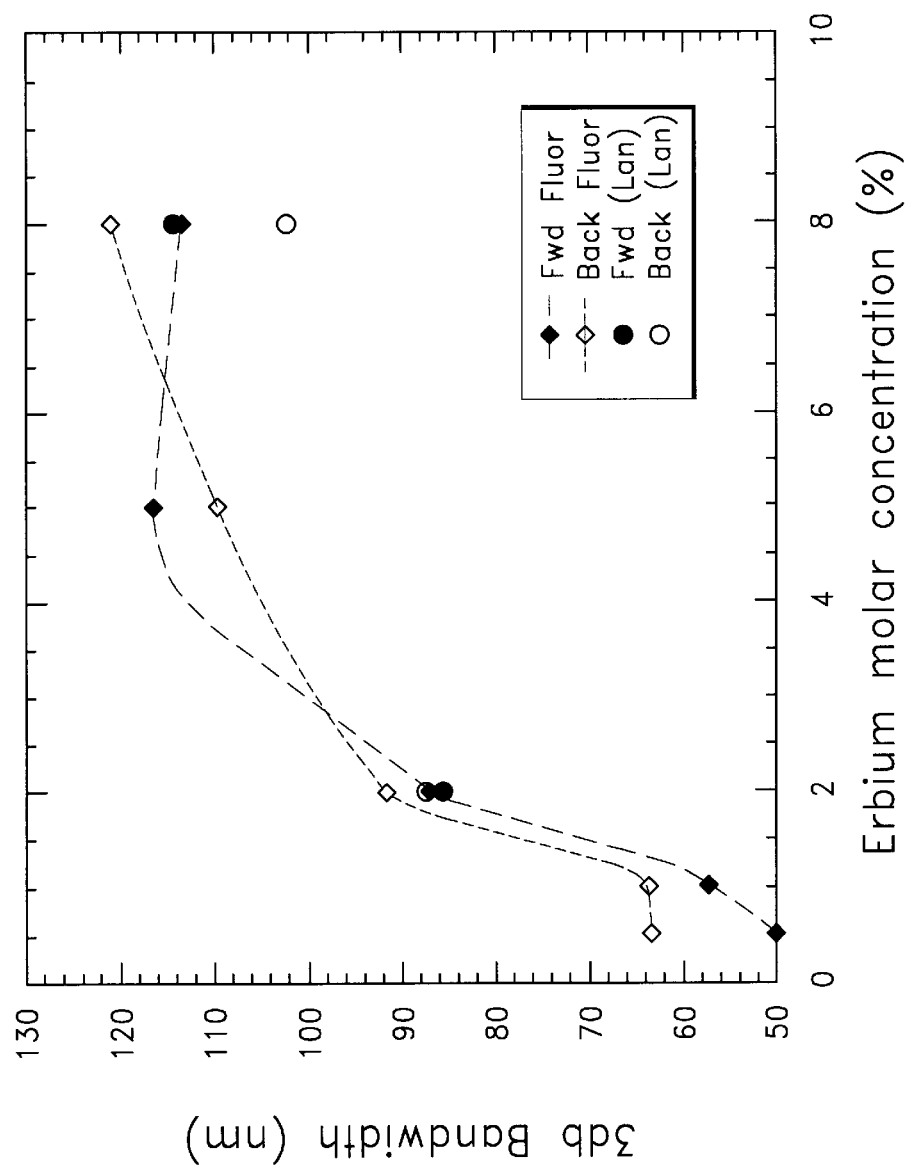
FIG. 5 illustrates the effect of increasing erbium molar concentration on the bandwidths of both the forward and backward fluorescence of erbium-doped amorphous YAG and erbium-doped amorphous lanthanum-substituted YAG.

The bandwidths of both the forward and backward fluorescence are found to generally increase with increasing concentration, as illustrated in FIG. 5. The diamonds represent erbium-doped amorphous YAG, while the circles represent erbium-doped amorphous lanthanum-substituted YAG. Forward and backward fluorescence are indicated by filled and open symbols, respectively. Within experimental errors, the two materials produce roughly identical performance.

Figure 6A:
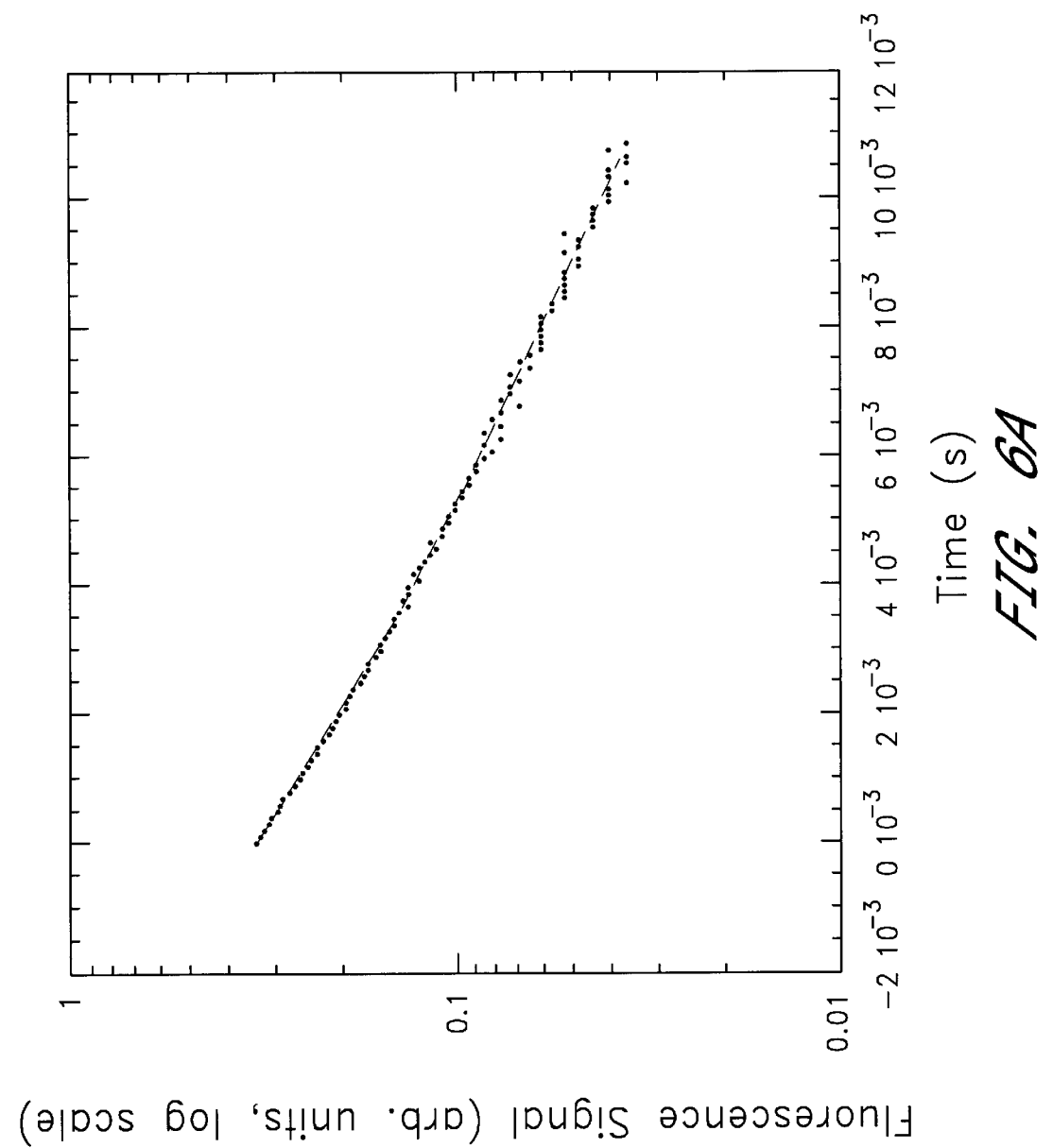
FIG. 6A illustrates the temporal decay (relaxation) of the fluorescence emitted by a 1% erbium-doped amorphous YAG fiber.
Figure 6B:
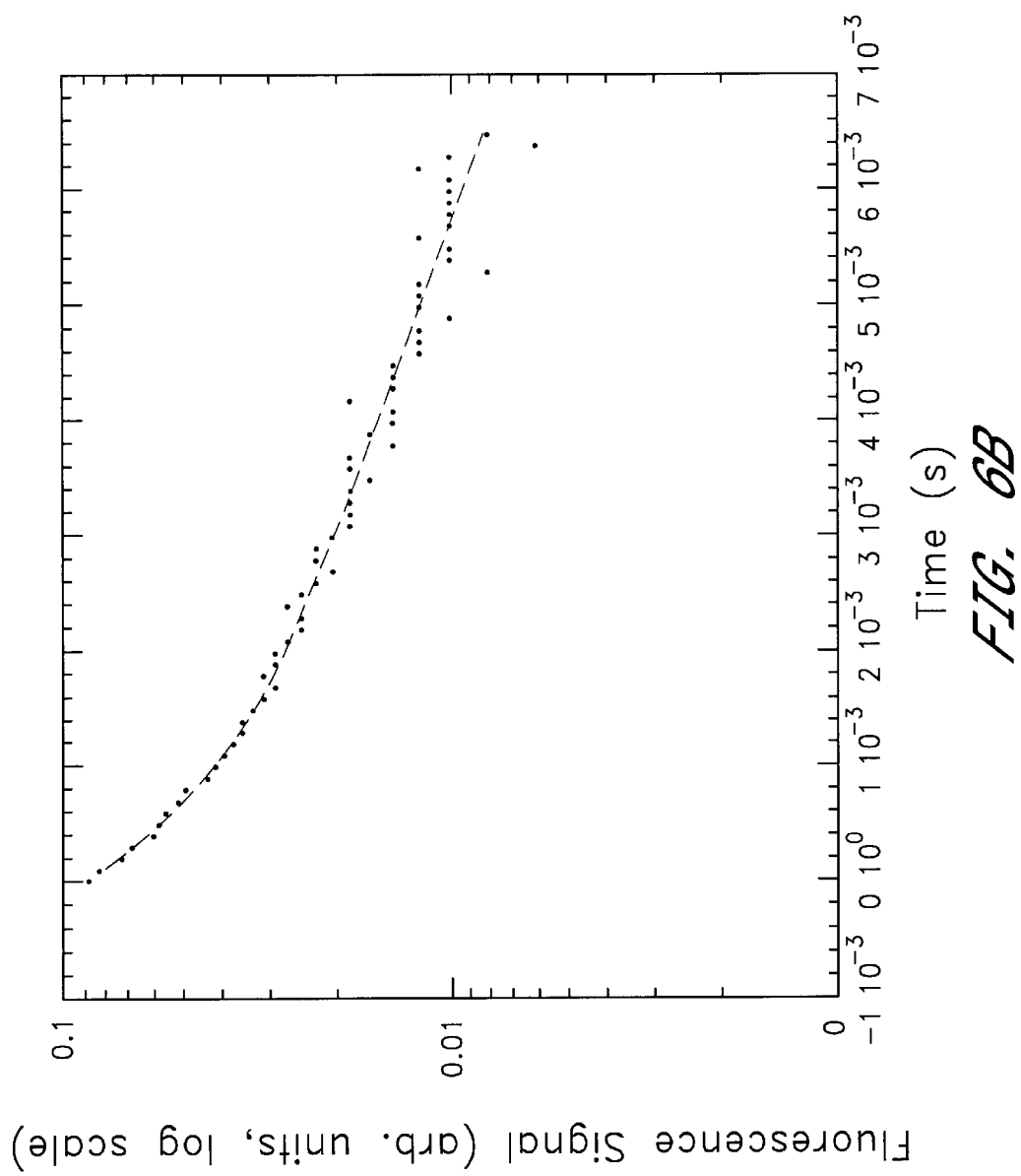
FIG. 6B illustrates the temporal decay (relaxation) of the fluorescence emitted by a 5% erbium-doped amorphous YAG fiber.

The temporal relaxation of the fluorescence is measured by modulating the pump intensity into square pulses about 20 milliseconds long and with a short fall time (approximately 5 microseconds) by placing an 80-MHz acousto-optic modulator in the path of the input pump beam. The temporal decay of the fluorescence emitted by the fiber after each pump pulse is then recorded with a fast photo-detector. For low erbium concentrations, the relaxation curves exhibit a single-exponential decay, as shown in FIG. 6A for a 1% erbium-doped amorphous YAG fiber. For higher erbium concentrations, the relaxation curve is no longer a single exponential, but rather an exponential decay with a time constant that increases with time. This is illustrated in FIG. 6B for a 5% erbium-doped amorphous YAG fiber. The curve starts to decay With a time constant $\tau_1$. As time goes on, this constant increases (decreasing slope), until at the lower end of the decay curve the time constant reaches an asymptotic value $\tau_2$ (larger than $\tau_1$).

Another important result apparent from FIGS. 6A and 6B is that the fibers are essentially free of erbium clusters, even at the highest concentrations. If clusters were present, the relaxation curves would exhibit first a very fast relaxation component due to clustered ions, then a slow component due to unclustered ions. (See, for example, P. F. Wysocki, et al., *Evidence and modeling of paired ions and other loss mechanisms in erbium-doped silica fibers*, in SPIE Proceedings on Fiber Laser Sources and Amplifiers IV, Vol. 1789, 1993, pp. 66–79.) In other materials this fast component is typically two to three orders of magnitude smaller than the radiative lifetime (i.e., it would be expected to be in the sub-100 microseconds range). The fact that no such component is observed shows that there is negligible erbium-ion clustering in these two new hosts, up to concentrations of 8% in amorphous YAG, which is about 600 times higher than the cluster-free concentration in silica-based glasses.

Figure 7:
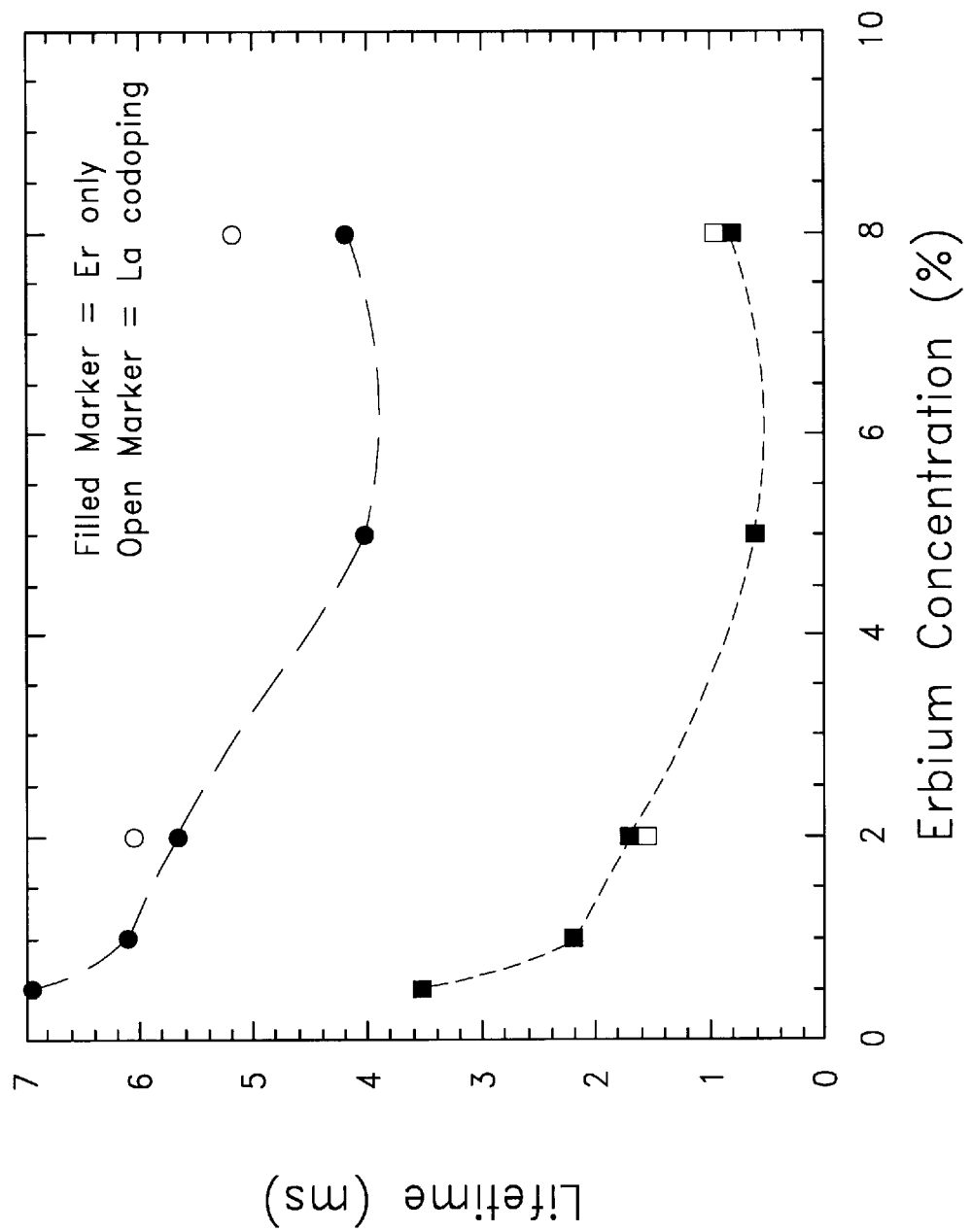
FIG. 7 illustrates the effect of erbium concentration on the fast component (square markers in lower curve) and the slow component (round markers in upper curve) of the fluorescence of the erbium-doped amorphous YAG fiber.

The lifetimes $\tau_1$ and $\tau_2$ inferred from decay curves measured for all available concentrations are plotted in FIG. 7. The squares represent the lifetimes for the fast component ($\tau_1$) and the circles represent the lifetimes for the slow component ($\tau_2$), while the filled and open symbols represent the amorphous YAG host fibers and the amorphous lanthanum-substituted YAG host fibers, respectively. Both lifetimes decrease approximately monotonically with increasing erbium concentration, as is commonly observed in other hosts. The slow component $\tau_2$ is the radiative lifetime. The lowest measured radiative lifetime is about 4 milliseconds in the 5% and 8% YAG fibers, while the shortest lifetime is in the range of 0.6–1.0 millisecond (also in these materials). For comparison, the lifetime of erbium in tellurite glasses, a host now considered for commercial EDFAs, is in the range of a few milliseconds, while in silica-based glasses it is typically 8 to 10 milliseconds.

Figure 15:
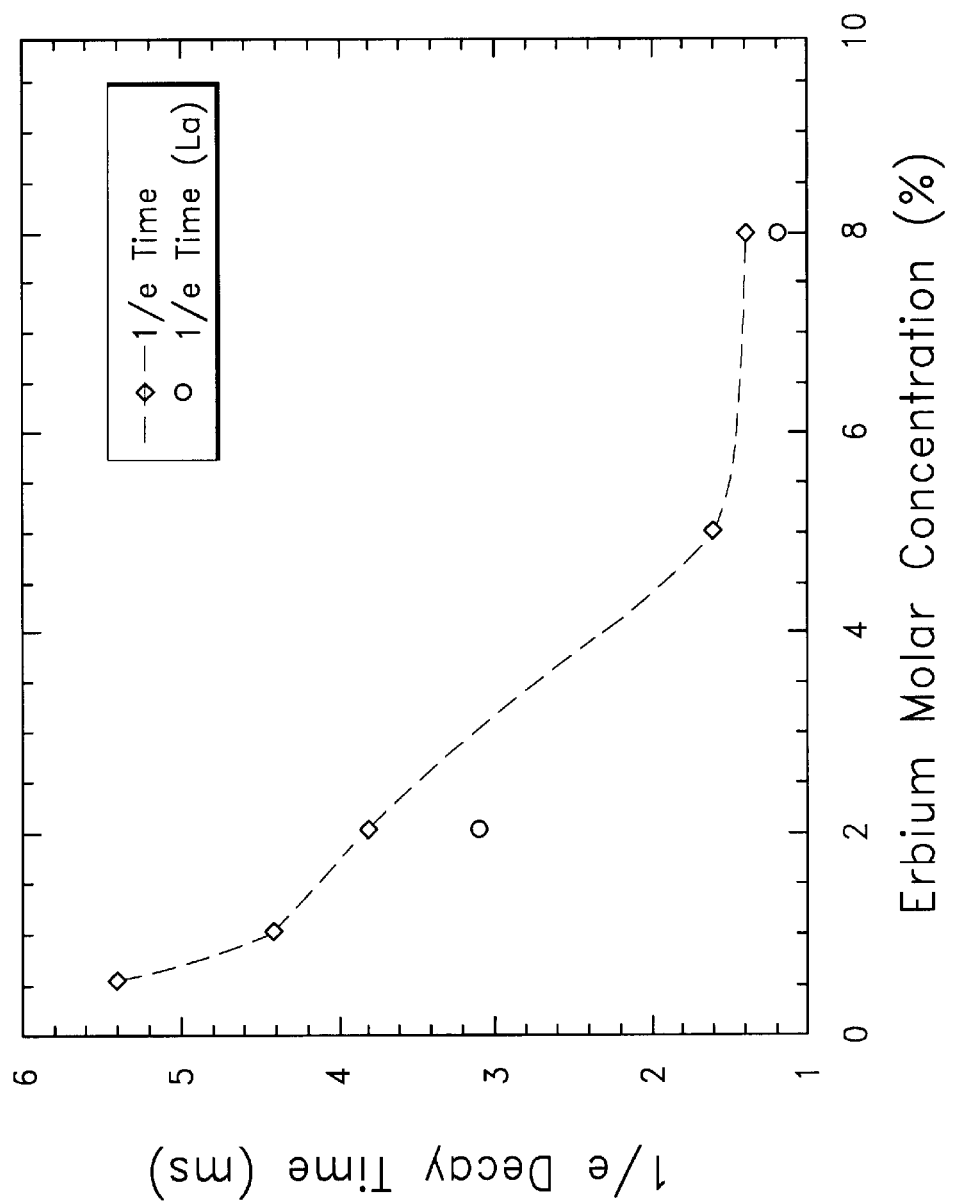
FIG. 15 illustrates the 1/e decay time constant of the fluorescence power, measured from the same fluorescence decay curves as FIGS. 6A and 6B, wherein the 1/e time constant represents an average of the fast and slow time constants.

To better assess the relative performance of the two materials, FIG. 15 illustrates the 1/e decay time constant of the fluorescence power, measured from the same fluorescence decay curves as FIGS. 6A and 6B. The 1/e time constant represents an average of the fast and slow time constants, and in a sense it provides a measure of the average lifetime of the excited state of the erbium ions (this average lifetime partly controls, in particular, the dynamics and saturation behavior of the amplifier). FIG. 15 shows that the 1/e lifetime decreases monotonically with increasing erbium concentration, and that erbium in the lanthanum-substituted material has a slightly lower lifetime, although the difference between the two materials is within experimental errors. The conclusion is that erbium in both materials exhibits approximately the same bandwidth and the same lifetime, with a slight advantage to amorphous YAG.

Glass fibers have also been doped with more than one kind of rare earth ion to take advantage of beneficial interactions between two or more dopant species. For example, erbium-doped fibers have been co-doped with $Yb^{3+}$ to allow pumping of the erbium ions near 1.06 microns. (See, for example, J. E. Townsend, et al., *$Yb^{3+}$ sensitised $Er^{3+}$ doped silica optical fibre with ultrahigh transfer efficiency and gain*, Electronics Letters, Vol. 10, No. 21, 1991, pp. 1958–1959.) The reason for this development is that it is in some respects advantageous to pump EDFAs (and other erbium-doped fiber devices) near 1.06 microns, a laser wavelength that is available in greater power and at a lower cost, from commercial Nd:YAG lasers or cladding-pumped neodymium-doped fiber lasers, than the 980-nanometer and 1,480-nanometer laser diodes currently used as pump sources. $Er^{3+}$ does not exhibit an absorption band near 1.06 microns, but $Yb^{3+}$ does. In a fiber co-doped with $Er^{3+}$ and $Yb^{3+}$ and pumped near 1.06 microns, the pump energy is absorbed by the $Yb^{3+}$ ions. Because the excited state of $Yb^{3+}$ ($^2F_{5/2}$) has an energy close to that of the $^4I_{11/2}$ level of $Er^{3+}$, the energy of an excited $Yb_{3+}$ ion is rapidly transferred to the $^4I_{11/2}$ level of a neighboring $Er^{3+}$ ion. Subsequent relaxation from this $^4I_{11/2}$ level brings the erbium ion to its underlying excited state ($^4I_{13/2}$ level). In effect, the ytterbium ions act as intermediaries by absorbing the pump and transferring the acquired energy to the erbium ions. This principle can be used for the same purpose in fibers similar to the ytterbium/erbium-doped amorphous YAG fibers identified in the last entry of Table I above.

Other optical fiber and waveguide devices of potential commercial importance have been demonstrated in glass fibers doped with rare earth ions other than $Er^{3+}$. In particular, continuous-wave (CW), Q-switched, and mode-locked fiber lasers operating anywhere from the ultraviolet to the far infrared have been demonstrated. (See, for example, *Rare Earth Doped Fiber Lasers and Amplifiers*, M. J. F. Digonnet, Ed., Marcel Dekker, Inc., New York, 1993.) The experimental results described above have been gathered with the $^4I_{13/2} \rightarrow {}^4I_{15/2}$ transition of $Er^{3+}$, but their generality should not be overlooked.

The characteristics of the erbium-doped amorphous YAG optical fibers described herein are advantageously used to provide a method of amplifying input optical signals over a broader bandwidth than the bandwidths provided by previous apparatuses and methods. By substituting an erbium-doped amorphous YAG fiber for known silica-based erbium-doped fibers, similar amplifier configurations provide amplification over a bandwidth which extends to approximately 1,650 nanometers, in contrast to the approximately 1,620-nanometer upper limit of previously known amplifiers.

Figure 8:
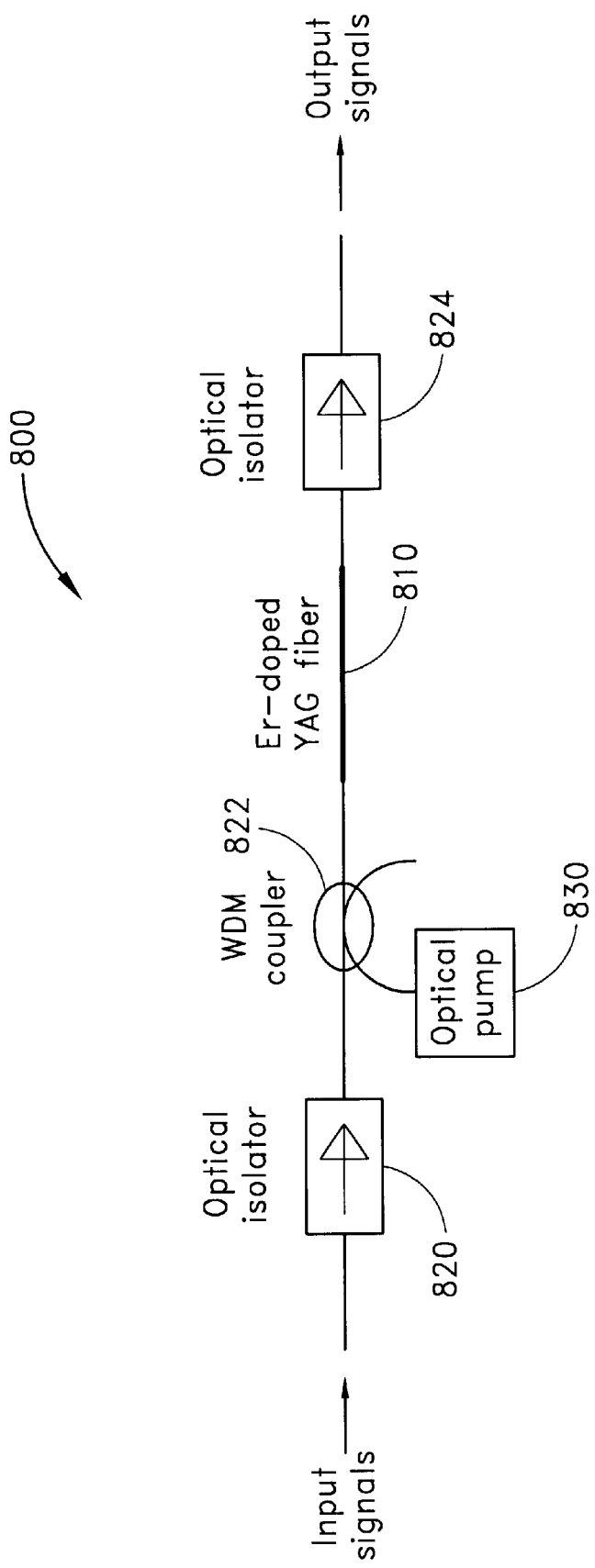
FIG. 8 illustrates a first configuration of an amplifier for implementing a first embodiment of the method of the present invention.

A first configuration 800 for use with the method of the present invention is illustrated in FIG. 8. FIG. 8 is similar to FIG. 1; however, in FIG. 8, the conventional erbium-doped fiber 110 is replaced with an erbium-doped amorphous YAG optical fiber 810. A first optical isolator 820, a wavelength division multiplexing (WDM) coupler 822, a second optical isolator 824 and an optical pump source 830 are included for the reasons described above in connection with FIG. 1.

The operation of the method of the present invention in connection with the configuration of FIG. 8 is similar to the operation of the EDFA 100 of FIG. 1. However, in contrast to the method of operation of the configuration of FIG. 1, the optical signals applied to the embodiment of FIG. 8 include wavelengths in the upper range of the L-band from approximately 1,610 nanometers to approximately 1,653 nanometers. Because of the extended fluorescence bandwidth of the erbium-doped amorphous YAG fiber 810, the optical signals having wavelengths in the 1,610–1,653 nanometer range are amplified within the erbium-doped amorphous YAG fiber 810. Thus, the method of operation of the configuration of FIG. 8 provides an extended gain bandwidth in comparison to the methods of operation of prior configurations. Alternatively, the same arrangement as in FIG. 8 can be used except that the pump is fed in a backward direction, or in both the forward direction and the backward direction.

FIG. 3 shows that the C-band of both the amorphous YAG material and the amorphous lanthanum-substituted YAG material are extremely broad, and that the C-band extends down to approximately 1,481 nanometers (the 3-dB point). For example, in the 0.5 centimeter, 8% erbium-doped amorphous YAG fiber, the backward fluorescence spectrum, which again contains dominantly the shorter wavelength portion of the $^4I_{13/2} \rightarrow {}^4I_{15/2}$ transition spectrum, extends from approximately 1,482 nanometers to approximately 1,603 nanometers (the 3-dB points). Another aspect of the present invention is a method of operating a C-band amplifier using the configuration of FIG. 8 to amplify a plurality of signals with wavelengths in the range of approximately 1,480 nanometers or higher to approximately 1,565 nanometers or lower. The lower wavelength of this range, namely approximately 1,480 nanometers, is substantially lower than the values reported for the same transition of $Er^{3+}$ in other known hosts.

Figure 2:
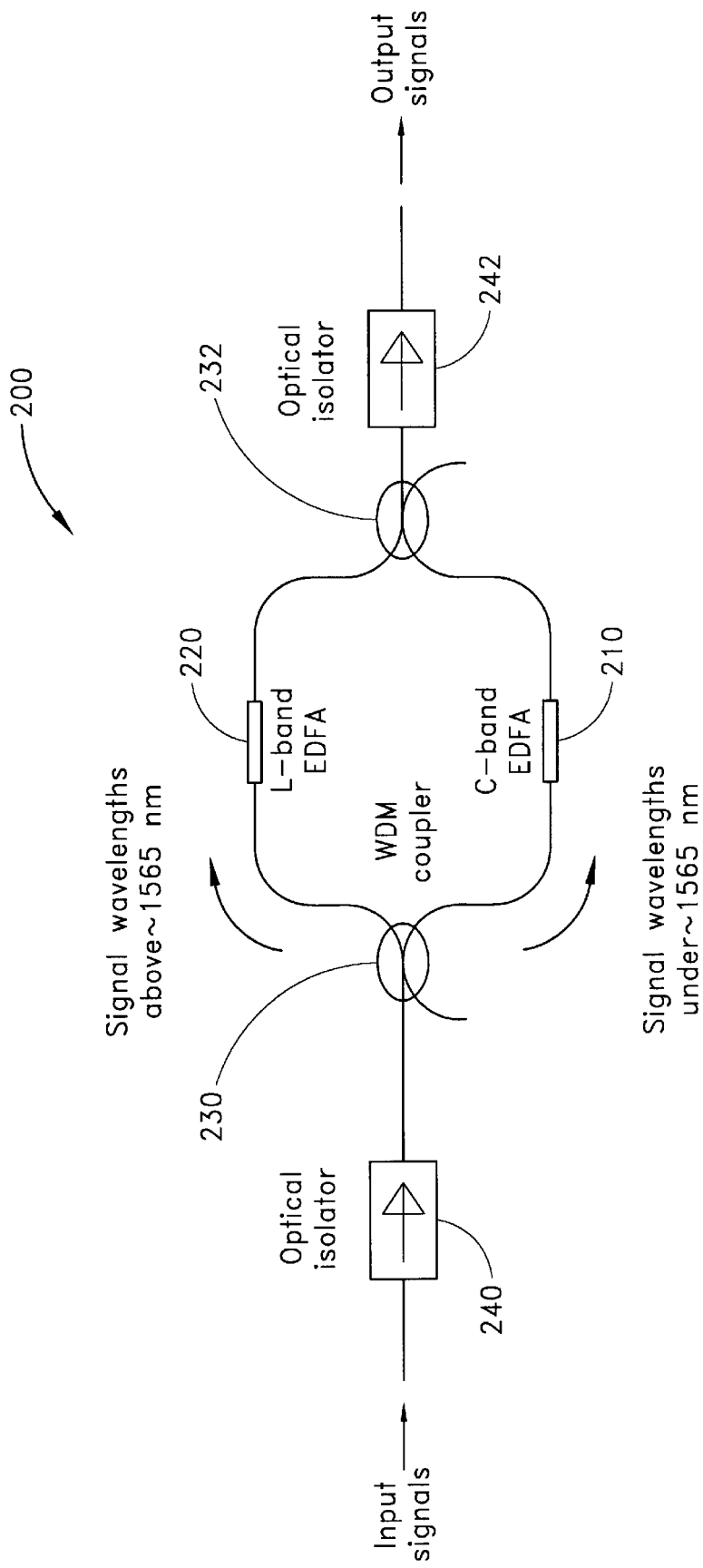
FIG. 2 illustrates an exemplary configuration having two EDFAs, wherein one EDFA amplifies the C-band and the other EDFA amplifies the L-band.
Figure 9:
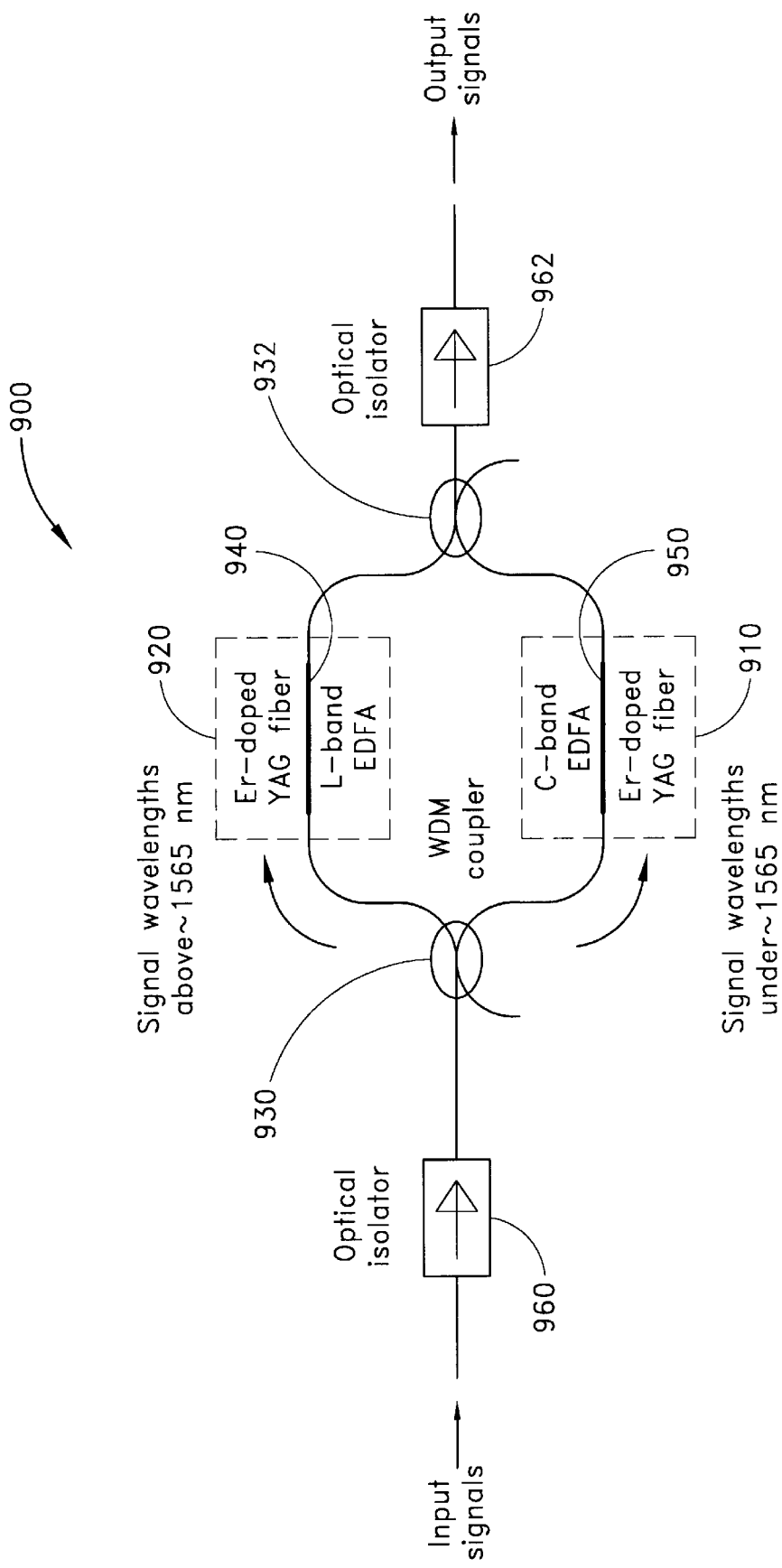
FIG. 9 illustrates a second configuration of an amplifier system for implementing a second embodiment of the method of the present invention.

FIG. 9 illustrates a further configuration 900 for use with the method of the present invention. The configuration 900 of FIG. 9 is similar to configuration 200 of FIG. 2 and includes a lower C-band EDFA 910 and an upper L-band EDFA 920. The input optical signals are coupled to the inputs of the two EDFAs 910, 920 by a WDM coupler 930. The outputs of the two EDFAs 910, 920 are combined in a coupler WDM 932, and the combined outputs are provided to an output port. Each EDFA 910, 920 has one or more respective pump sources (not shown). In FIG. 9, the upper (L-band) EDFA 920 comprises an erbium-doped amorphous YAG optical fiber 940 described above. The lower (C-band) EDFA 910 also advantageously includes an erbium-doped amorphous YAG optical fiber 950; however, either the lower EDFA 910 or the upper EDFA 920 may also be a conventional EDFA using conventional silica-based or other glass-based optical fiber. A first optical isolator 960 prevents backward reflections from the EDFAs 910, 920 into the input port. A second optical isolator 962 prevents backward reflections from the output port to the EDFAs 910, 920.

The present invention operates with the configuration 900 of FIG. 9 by applying input optical signals having wavelengths in a range from approximately 1,481 nanometers or lower to approximately 1,653 nanometers or higher. The WDM coupler 930 divides the input optical signals such that input optical signals having wavelengths less than approximately 1,565 nanometers are coupled to the lower EDFA 910 and input optical signals having wavelengths greater than approximately 1,565 nanometers are coupled to the upper EDFA 920. The lower EDFA 910 amplifies the signals in the range from approximately 1,481 nanometers to approximately 1,565 nanometers and provides amplified output signals to the output port via the coupler 932. The upper EDFA 920 amplifies the signals in the range from approximately 1,565 nanometers to approximately 1,653 nanometers and provides amplified output signals to the output port via the coupler 932. One skilled in the art will appreciate that a deadband in the optical input signals can be provide around 1,565 nanometers to preclude amplification of signals at that wavelength by both EDFAs 910, 920. As before, the use of the erbium-doped amorphous YAG fiber 940 in either the upper EDFA 920 or the lower EDFA 910 or both EDFAs, provides amplification over a broader bandwidth than was previously available.

The upper (L-band) EDFA 920 in FIG. 9 may be advantageously configured as one of the embodiments described in FIGS. 10–14.

Figure 10:
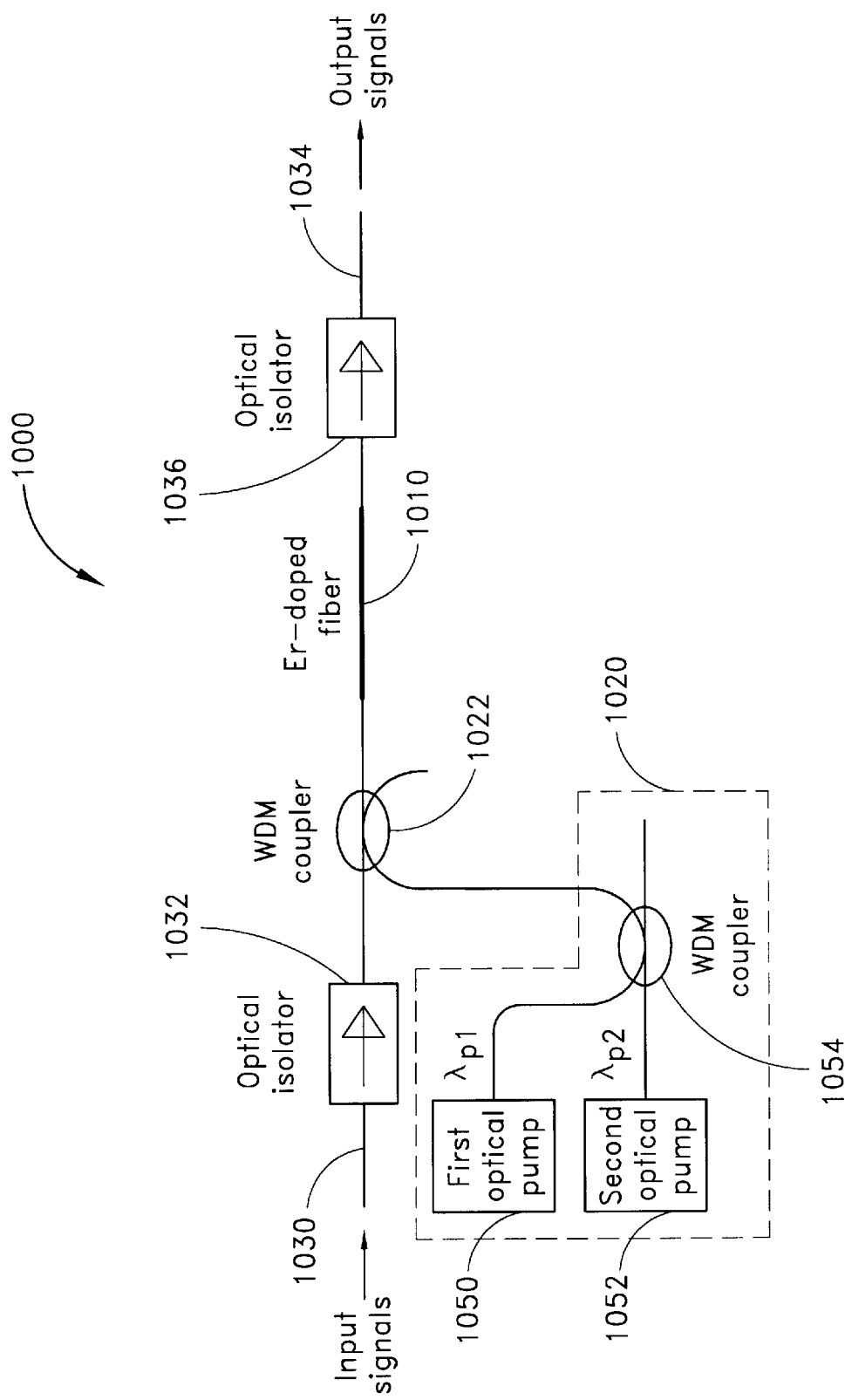
FIG. 10 illustrates a forward L-band amplifier comprising a single length of erbium-doped amorphous YAG fiber.

FIG. 10 illustrates a forward L-band amplifier 1000 comprising a single length 1010 of erbium-doped amorphous YAG fiber, as described above. The fiber 1010 is pumped by an optical pump source 1020 via one input of a first WDM coupler 1022. Input optical signals on an input port 1030 are applied to the fiber 1010 via a first optical isolator 1032 and a second input of the first WDM coupler 1022. The output of the fiber 1010 is provided to an output port 1034 via a second optical isolator 1036. The input port 1030 of the amplifier 1000 in FIG. 10 is coupled to the upper output port of the WDM coupler 930 in FIG. 9, and the output port 1034 is coupled to the upper input port of the coupler 932 in FIG. 9. In FIG. 10, the optical pump source 1020 comprises a first optical pump 1050 which provides pump light at a first optical pump wavelength $\lambda_{p1}$ and a second optical pump 1052 which provides pump light at a second optical pump wavelength $\lambda_{p2}$. The outputs of the two pumps 1050, 1052 are combined in a second WDM coupler 1054. The output of the second WDM coupler 1054 is provided to the first input of the first WDM coupler 1022 as the composite pump signal. The two pump signals can be multiplexed in other known methods. In one preferred method of operation, the first pump wavelength $\lambda_{p1}$ is either 980 nanometers or 1,480 nanometers (or another pump wavelength of $Er^{3+}$ that is preferably free of pump excited-state absorption), and the second pump wavelength $\lambda_{p2}$ is approximately 1,555 nanometers. These pump signals can be generated with a semiconductor laser or with other solid-state lasers. The two wavelengths $\lambda_{p1}$ and $\lambda_{p2}$ are injected into the fiber 1010 from the first WDM coupler 1022. The first pump wavelength $\lambda_{p1}$ has the same role as the pump wavelength in a C-band EDFA. In particular, the first pump wavelength $\lambda_{p1}$ produces population inversion in the fiber 1010 and therefore provides gain. However, the gain spectrum is largest in the C-band, and relatively weak in the L-band. As a result, spontaneous emission is strongly amplified in the C-band, yielding a strong C-band amplified spontaneous emission (ASE) that depletes the gain over the entire gain bandwidth of the fiber 1010, including the gain in the L-band. Thus, the gain in the L-band is reduced, and, in general the gain in the L-band becomes too low to be of practical use. To improve the L-band gain, the C-band ASE is reduced. In the method of operation with the configuration of FIG. 10 the C-band ASE is reduced by the second pump at the wavelength $\lambda_{p2}$. The wavelength of the second pump is selected to be approximately 1,555 nanometers to coincide with a high-gain region in the C-band. The pump at the wavelength $\lambda_{p2}$ injected into the fiber 1010 is strongly amplified, which causes a depletion of the gain in both the C-band and the L-band. But the pump at the wavelength $\lambda_{p2}$ also dramatically reduces the power in the C-band ASE (See, for example, J. F. Massicott, et al., *Low noise operation of $Er^{3+}$ doped silica fibre amplifier around 1.6 μm, Electronics Letters,* Vol. 28, No. 20, September 1992, pp. 1924–1925.) The reduced power in the C-band ASE causes the gain in both bands to increase. Of these two antagonistic effects, the latter turns out to dominate, so that the L-band gain increases, and even dominates over the C-band gain. This type of L-band amplifier has a good (low) noise figure, but its gain efficiency is low (it requires a high pump power to produce a certain gain).

Figure 11:
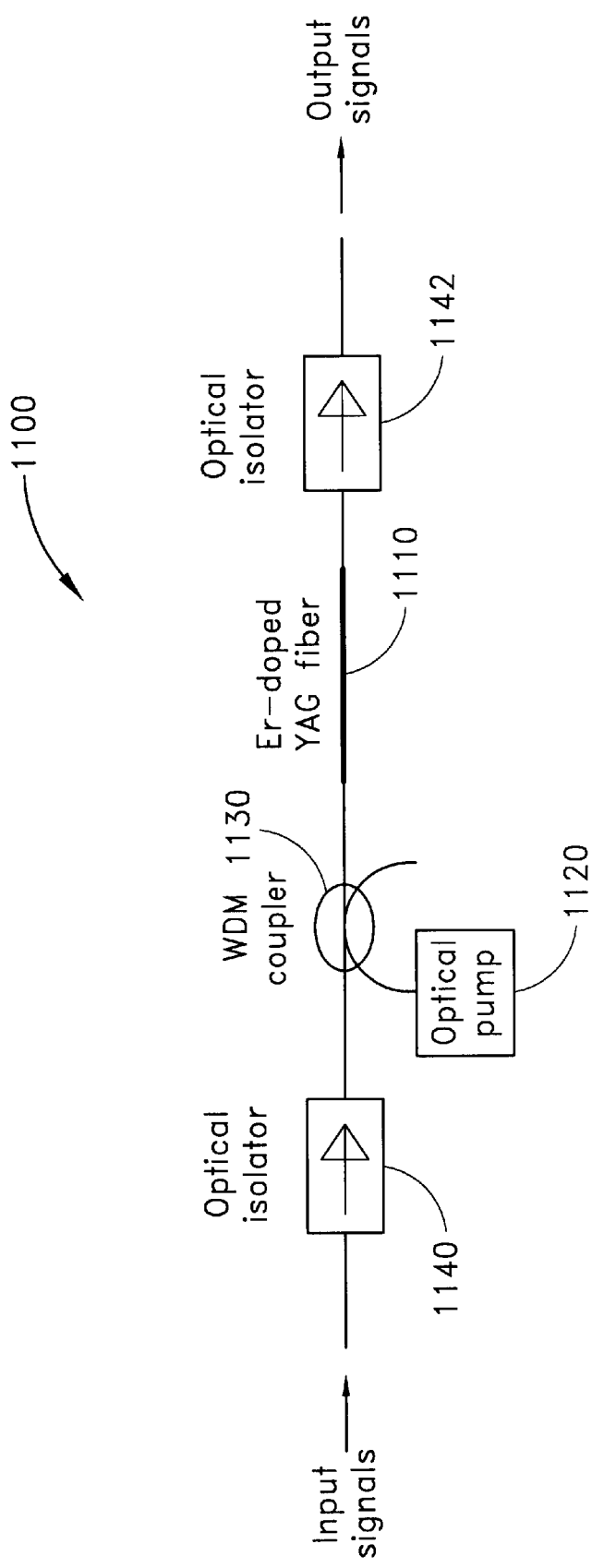
FIG. 11 illustrates an amplifier configuration similar to the configuration of FIG. 8 but with a longer erbium-doped amorphous YAG fiber for use as an L-band amplifier.

FIG. 11 illustrates a configuration 1100 similar to the configuration of FIG. 8. The configuration 1100 includes a forward pumped erbium-doped amorphous YAG fiber 1110. The fiber 1110 can be pumped at either 980 nanometers or 1,480 nanometers (or another pump-ESA-free pump wavelength of erbium) from an optical pump source 1120 via a WDM coupler 1130. First and second optical isolators 1140, 1142 operate as described above.

The configuration shown in FIG. 11 is forward pumped. Backward pumping and bidirectional pumping are also possible. Erbium exhibits a strong ground-state absorption (GSA) in the C-band, but little to no GSA in the L-band. GSA decreases with increasing wavelength in the L-band. Consequently, when the length of the fiber 1110 is increased, at some point GSA for C-band wavelengths becomes so large that for a given pump power there is no gain, but rather loss, in the C-band. On the other hand, in the L-band there is much less GSA, and gain is obtained. So a general method to design an amplifier with sizable gain in the L-band is to select a fiber 1110 that is long enough, for example, twice as long as required for a C-band amplifier in the same type of fiber. This approach destroys the gain in the C-band and drastically reduces the ASE in the C-band. Thus, the configuration of FIG. 11 becomes an L-band amplifier which may be incorporated into the upper arm of the configuration of FIG. 9.

Figure 12:
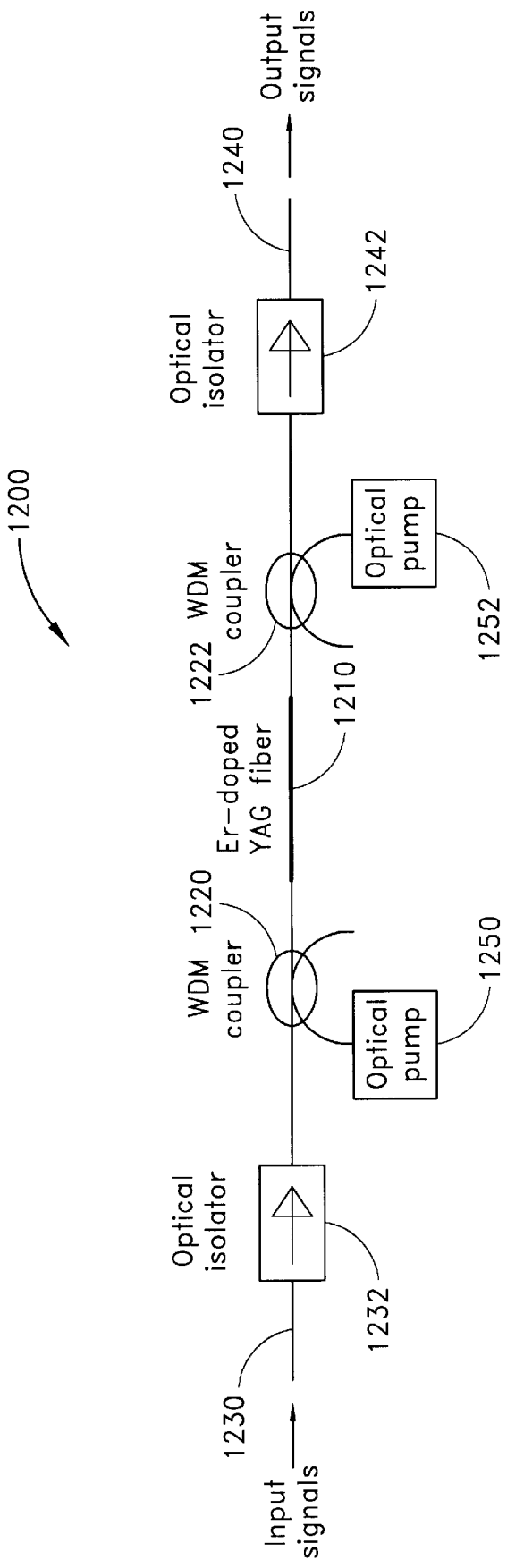
FIG. 12 illustrates a configuration of an L-band amplifier in which an erbium-doped amorphous YAG fiber is positioned between two WDM couplers which receive respective pump signals to pump the erbium-doped amorphous YAG fiber in both the forward direction and the backward direction.

FIG. 12 illustrates a further configuration 1200 of an L-band amplifier which is similar to the amplifier illustrated in FIG. 11. The configuration 1200 includes an erbium-doped amorphous YAG fiber 1210 between two WDM couplers 1220, 1222. The first WDM coupler 1220 is coupled to an input port 1230 via a first optical isolator 1232. The second WDM coupler 1222 is coupled to an output port 1240 via a second optical isolator 1242. A first optical pump source 1250 is coupled to the fiber 1210 via the first WDM coupler 1220 to propagate pump light in the fiber 1210 in the direction from the first WDM coupler 1220 towards the second WDM coupler 1222. A second optical pump source 1252 is coupled to the fiber 1210 via the second WDM coupler 1222 to propagate pump light in the fiber 1210 in the direction from the second WDM coupler 1222 towards the first WDM coupler 1220. Thus, the pump light from the two sources propagate bidirectionally in the fiber 1210. A similar, bidirectional configuration using conventional erbium-doped fibers is described, for example, in H. Ono, et al., *Gain-flattened $Er^{3+}$-doped fiber amplifier for a WDM signal in the 1.57–1.60-μm wavelength region, IEEE Photonics Technology Letters,* Vol. 9, No. 5, May 1997, pp. 596–598, which shows a similar embodiment using conventional erbium-doped silica fibers. The configuration of FIG. 12 operates in a similar manner to the configuration of FIG. 11. The second pump source 1252, which provides pump light in the backward direction, is used to enable adjustment of the gain spectrum. In particular, the gain spectrum can be flattened over much of the L-band bandwidth by properly adjusting the backward pump power.

Figure 13:
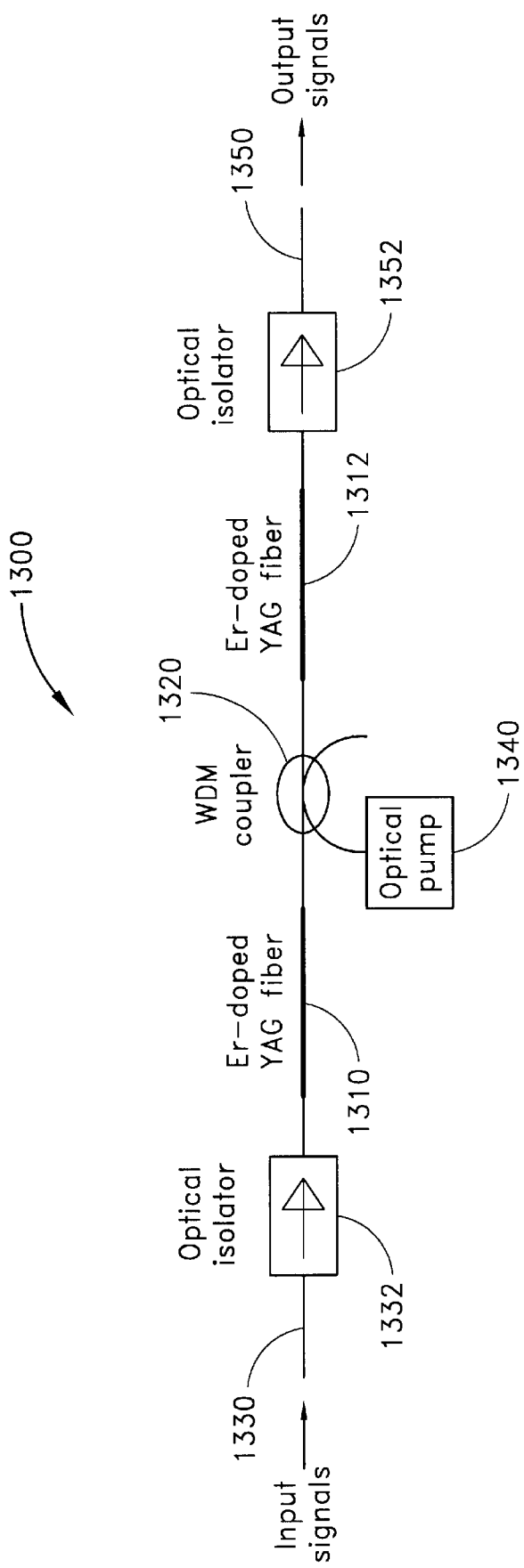
FIG. 13 illustrates a configuration of an L-band amplifier which comprises two erbium-doped amorphous YAG fibers connected in series via a WDM coupler, with pump light introduced to forward pump the second fiber.

FIG. 13 illustrates a further configuration 1300 of an L-band amplifier. The configuration 1300 comprises two erbium-doped amorphous YAG fibers 1310, 1312, which are connected in series via a WDM coupler 1320. In particular, an input port 1330 is coupled to one end of the first fiber 1310 via a first optical isolator 1332. The other end of the first fiber 1310 is connected to one input of the WDM coupler 1320. A pump source 1340 is connected to a second input of the WDM coupler 1320. The output of the WDM coupler 1320 is connected to one end of the second fiber 1312. The other end of the second fiber 1312 is connected to an output port 1350 via a second optical isolator 1352. The wavelength of the pump light provided by the pump source 1340 is advantageously around 980 nanometers or around 1,480 nanometers. The pump source 1340 pumps the second fiber 1312, which produces gain in the second fiber 1312. The second fiber 1312 produces amplified spontaneous emission (ASE) in the backward direction, i.e., emitted towards the WDM coupler 1320. The ASE from the second fiber 1312 is coupled by the WDM coupler 1320 into the first fiber 1310. This ASE is centered around about 1,550 nanometers (the C-band), and the ASE is absorbed by the first fiber 1310. The first fiber 1310 is thus optically pumped and produces gain in the L-band region. See, for example, J. Lee, et al., *Enhancement of the power conversion efficiency for an L-band EDFA with a secondary pumping effect in the unpumped EDF section, IEEE Photonics Technology Letters,* Vol. 11, No. 1, January 1999, pp. 42–44, which shows a similar embodiment using conventional erbium-doped silica fibers.

Figure 14:
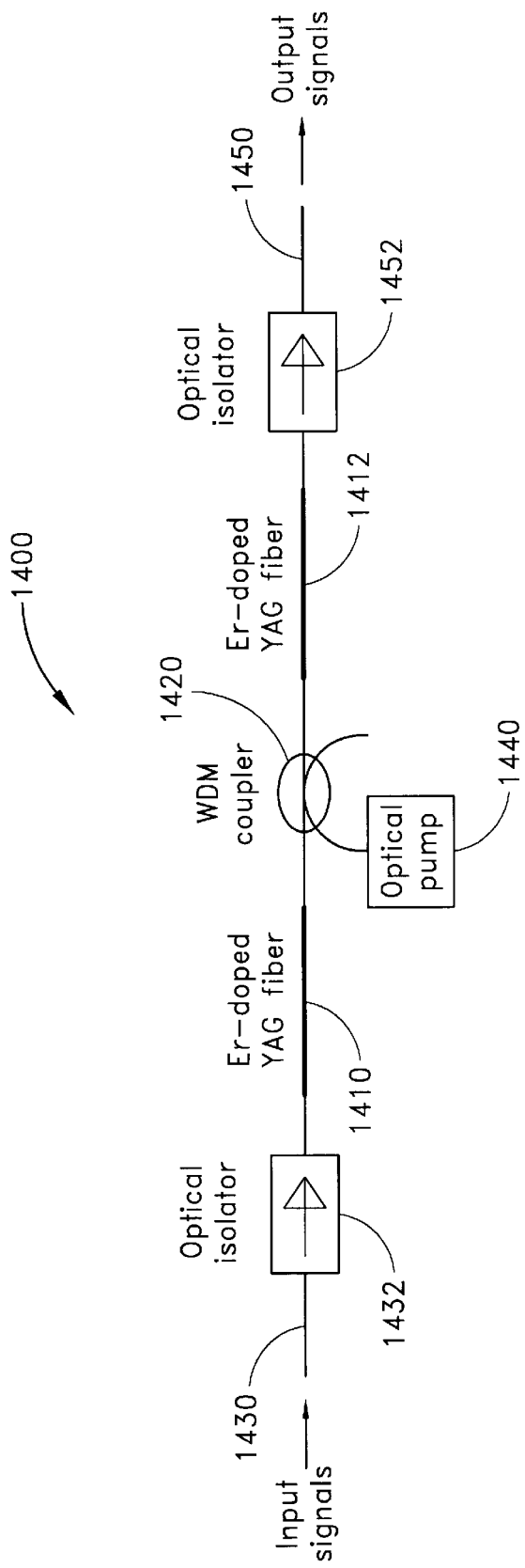
FIG. 14 illustrates an amplifier configuration which includes a first erbium-doped amorphous YAG fiber and a second erbium-doped amorphous YAG fiber connected in series via a WDM multiplexer, with the pump light introduced to backward pump the first fiber.

FIG. 14 illustrates a configuration 1400 similar to the configuration 1300 of FIG. 13. The configuration 1400 includes a first erbium-doped amorphous YAG fiber 1410 and a second erbium-doped amorphous YAG fiber 1412 connected in series via a WDM multiplexer 1420. In particular, an input port 1430 is coupled to one end of the first fiber 1410 via a first optical isolator 1432. The other end of the first fiber 1410 is connected to an input of the WDM coupler 1420. A pump source 1440 is connected to a second input of the WDM coupler 1420; however, unlike the embodiment of FIG. 13, the pump source 1440 is connected to a second input of the WDM coupler 1420 which is opposite the first input of the WDM coupler 1420. The output of the WDM coupler 1420 is connected to one end of the second fiber 1412. The other end of the second fiber 1412 is connected to an output port 1450 via a second optical isolator 1452. In the configuration 1400, the pump light from the pump source 1440 is directed to the first fiber 1410, and the ASE output of the first fiber 1410 around 1,555 nanometers provides the pump light for the second fiber 1412. The backward-pumped dual-EDFA of FIG. 14 is advantageously slightly more efficient than the forward-pumped EDFA of FIG. 13. See, for example, J. Lee, et al., *Enhancement of the power conversion efficiency for an L-band EDFA with a secondary pumping effect in the unpumped EDF section, IEEE Photonics Technology Letters,* Vol. 11, No. 1, January 1999, pp. 42–44, which shows a similar embodiment using conventional erbium-doped silica fibers.

It is understood in the art that these various configurations present certain advantages in terms of efficiency and noise figure, but also in terms of size, complexity, cost, reproducibility in manufacturing, etc. Furthermore, a particular configuration might be preferable in a certain type of application, and another configuration might be preferable in another application.

The method in accordance with the present invention has many advantageous characteristics in comparison with known methods using amplifiers constructed from other fibers or waveguides comprising, for example, silica, fluorozirconate, tellurite, or the like. For example, one advantageous characteristic of the method is that the bandwidth of the C band is wider than that of erbium in other known broadband materials. Fluorescence has been observed down to approximately 1,481 nanometers (3-dB point) in some material compositions which indicates an extended bandwidth on the short-wavelength tail of the C band. Thus, in these amorphous YAG-composition materials, the gain bandwidth is substantially broadened in the short-wavelength tail of the C band.

A second characteristic of the method is that the bandwidth of the L band is wider than that of erbium in other known broadband materials. Fluorescence has been observed up to approximately 1,653 nanometers (3-dB point) in some material compositions, which indicates an extended bandwidth on the long-wavelength tail of the L band. The L-band bandwidth is approximately 60% wider than that of erbium in any other known fiber materials.

A third characteristic of the method is that by combining the aforementioned L-band amplifier and the aforementioned C-band amplifier, utilizing the general circuit illustrated in FIG. 9, or by utilizing the circuit of FIG. 8, the resulting amplifier provides C-band plus L-band gain over a bandwidth broader than that of erbium in any other known broadband materials. For example, using the circuit of FIG. 9, fluorescence can be observed from approximately 1,481 nanometers to approximately 1,653 nanometers, or a 3-dB bandwidth of approximately 172 nanometers, which is approximately twice as wide as the widest fluorescence bandwidth observed with erbium in other known broadband materials.

A fourth characteristic of the method is that the method may be carried out using very short L-band and C-band fiber amplifiers, a feature that has several benefits, such as, for example, compactness and reduced cost. Another important technical benefit is that the method exhibits reduced detrimental nonlinear effects, which are a concern for known L-band amplifiers. In any optical fiber, when the product of the traveling signal intensity by the length over which the signals travel becomes too large, some nonlinear effects begin to take place, such as, for example, stimulated Brillouin scattered (SBS) and cross-phase modulation (XPM). Both effects are detrimental to the operation of the EDFA. SBS converts forward-propagating signal light into backward-propagating signal light, with an associated frequency shift. Both the generation of the backward propagating light and the frequency shift are detrimental. The XPM effect can cause information encoded on one signal to be partially transferred to another signal, which leads to undesirable cross-talk. The SBS effect and the XPM effect take place in the communication portion of a fiber link as well as in the EDFA itself. The communication fiber is very long (tens of kilometers), but the mode field of the communication fiber is comparatively large (i.e., the intensity is lower for a given pump power), which reduces both the XPM and the SBS effect in the communication fiber. On the other hand, an EDFA involves a much shorter length of fiber, but its mode field is generally considerably smaller (i.e., the erbium-doped fiber carries a much higher signal intensity than the communication fiber). Thus, the XPM effect can be strong in an EDFA, especially in conventional L-band EDFAs, which involve a longer erbium-doped fiber than conventional C-band EDFAs. The erbium-doped amorphous YAG materials used in accordance with the method of the present invention avoid these problems by reducing the fiber length required roughly in the ratio of erbium concentrations, which is typically a factor of 100 or more. Therefore, the efficiencies of the XPM effect and the SBS effect in these fibers are also reduced because of the reduced fiber length.

For each of the configurations presented herein, the length of the various erbium-doped fibers, the power in the various pumps, and other parameters, can be evaluated theoretically and experimentally to optimize certain EDFA parameters, such as gain, gain profile, noise figure, pump efficiency, etc., using theoretical models and experimental techniques that are described in the literature and are well known in the art.

Although the method of the present invention is described above in connection with erbium-doped amorphous YAG fibers, it should be understood that the method can also be practiced using planar waveguide technology as well. In particular, the method can be practiced with planar channel waveguides when such waveguides are constructed using erbium-doped amorphous YAG material.

The method of the present invention arises in part from the discovery that the $^4I_{13/2} \rightarrow {}^4I_{15/2}$ transition of $Er^{3+}$ in amorphous YAG exhibits a fluorescence bandwidth that is extremely wide, namely about 121 nanometers in a fiber doped with 8% of erbium, and in part from the discovery that higher concentrations of $Er^{3+}$ (and perhaps other rare earth ions) lead to a broader fluorescence bandwidth and to broader optical gain spectra.

Applicants have described a method of amplification for L-band erbium-doped fiber amplifiers which uses a new class of materials that produce a substantially wider L-band spectrum for the $^4I_{13/2} \rightarrow {}^4I_{15/2}$ transition of $Er^{3+}$ than any other known material. Applicants have also described a method of amplification for C-band erbium-doped fiber amplifiers which uses a new class of materials that produce a substantially wider C-band spectrum for the $^4I_{13/2} \rightarrow {}^4I_{15/2}$ transition of $Er^{3+}$ than any other known material.

Description from International Publication No. WO 97/25284

One exemplary method of manufacturing a fiber that can advantageously be used to implement the present invention is disclosed by Paul C. Nordine, et al., in *Fiber Drawing from Undercooled Molten Materials,* WIPO International Publication No. WO 97/25284, published on Jul. 17, 1997. The full description of that method is incorporated by reference herein. The detailed description is set forth below in connection with FIGS. 16–23, which correspond to FIGS. 1–8 of WO 97/25284.

According to International Publication No. WO 97/25284, Paul C. Nordine, et al., were surprised to discover that the undercooling of certain liquid melts under controlled conditions can result in the formation of melts with sufficient viscosity to enable fiber drawing without recrystallization of the bulk liquid, including melts with melting point viscosities too low to allow such operations. Described herein are examples of fibers drawn from undercooled melts of several oxide materials for which fibers could not be drawn from the melts at or above the melting point. Utilizing the methods of WO 97/25284, fibers were readily drawn from such melts under undercooled conditions of temperatures up to and exceeding 20% below the equilibrium melting temperature. Also surprisingly, glass fibers may be drawn from undercooled melts of chemical compositions which contain higher concentrations of additives than are present in prior art fibers. In addition, it is noted that fibers drawn according to the methods of WO 97/25284 have surprisingly high tensile strengths, hypothesized to be due to the relatively unflawed surface of the fibers of WO 97/25284.

The methods of WO 97/25284 utilize a "stinger" to initiate the draw. The ability to grow fibers is significantly influenced by the physical properties of the stinger, and by several conditions under which the stinger is used, such as the material, dimension, surface finish, depth of insertion of the stinger tip in the liquid, and the residence time of the stinger in the liquid before drawing is initiated. The control of these properties and processes influences the surface wetting and adhesion and allows for considerable control over the fiber drawing process.

Briefly described, the steps of the method of WO 97/25284 include (i) melting specimens of selected materials under either containerless conditions to create suspended liquid drops or under contained conditions such as, for example, in a crucible, (ii) cooling the liquid to a temperature below the melting point, i.e., to undercool the liquid, and (iii) contacting the undercooled liquid with a stinger probe and withdrawing the probe under desired conditions to draw a fiber from the liquid.

In all cases, control of the fiber diameter is obtained by controlling (i) liquid viscosity (by changing the melt temperature and/or the gas environment), and (ii) the fiber drawing rate. Gases used in the experiments described below include, for example, oxygen, air and argon, although other gases such as, for example, nitrogen, helium, carbon monoxide, carbon dioxide, hydrogen and water vapor may also be used. In general, faster drawing rates and/or smaller viscosities favored smaller diameter fibers. The upper limit to the fiber diameter was determined by the minimum drawing rate that could be used without inducing crystallization in the bulk undercooled melt. The lower limit to the fiber diameter was determined by the maximum drawing rate that could be achieved without breaking the fiber or drawing it out of the melt.

Additionally, glass fibers drawn in accordance with the methods of WO 97/25284 may be converted to crystalline fibers by heating the glass fibers to a temperature at which crystallization of the particular glass occurs.

The method described in WO 97/25284 permits high purity fibers to be manufactured from a number of materials that are known to exhibit high strength and stiffness, low creep rates, high oxidation resistance, or chemical compatibility with the components of composite materials at high temperatures. It allows fibers to be formed from materials that exhibit low absorption of electromagnetic radiation, such as but not limited to those used in telecommunications applications, and as fiber optic light guides, and from high purity materials. The method disclosed in WO 97/25284 also allows synthesis of homogeneous glass fibers which may include high concentrations of dopant elements for uses such as but not limited to fiber laser and fiber laser amplifier applications. According to WO 97/25284, the fibers may be drawn rapidly, enabling less expensive production, and may be crystallized to form stable materials which may be used, for example, in oxidation-resistant composite materials with very high temperature structural applications such as turbine combustion chamber liners and thrust deflectors. The method of WO 97/25284 also allows the synthesis of fibers with improved tensile strength and stiffness for use in polymer-matrix composite materials applications. In addition, the method of WO 97/25284 allows fibers to be formed from bio-compatible materials for in vivo medical applications. Thus, the method of WO 97/25284 greatly expands the range of materials that can be made into fibers by drawing from liquid melts.

EXAMPLE 1

Fiber Drawing Device

Figure 16:
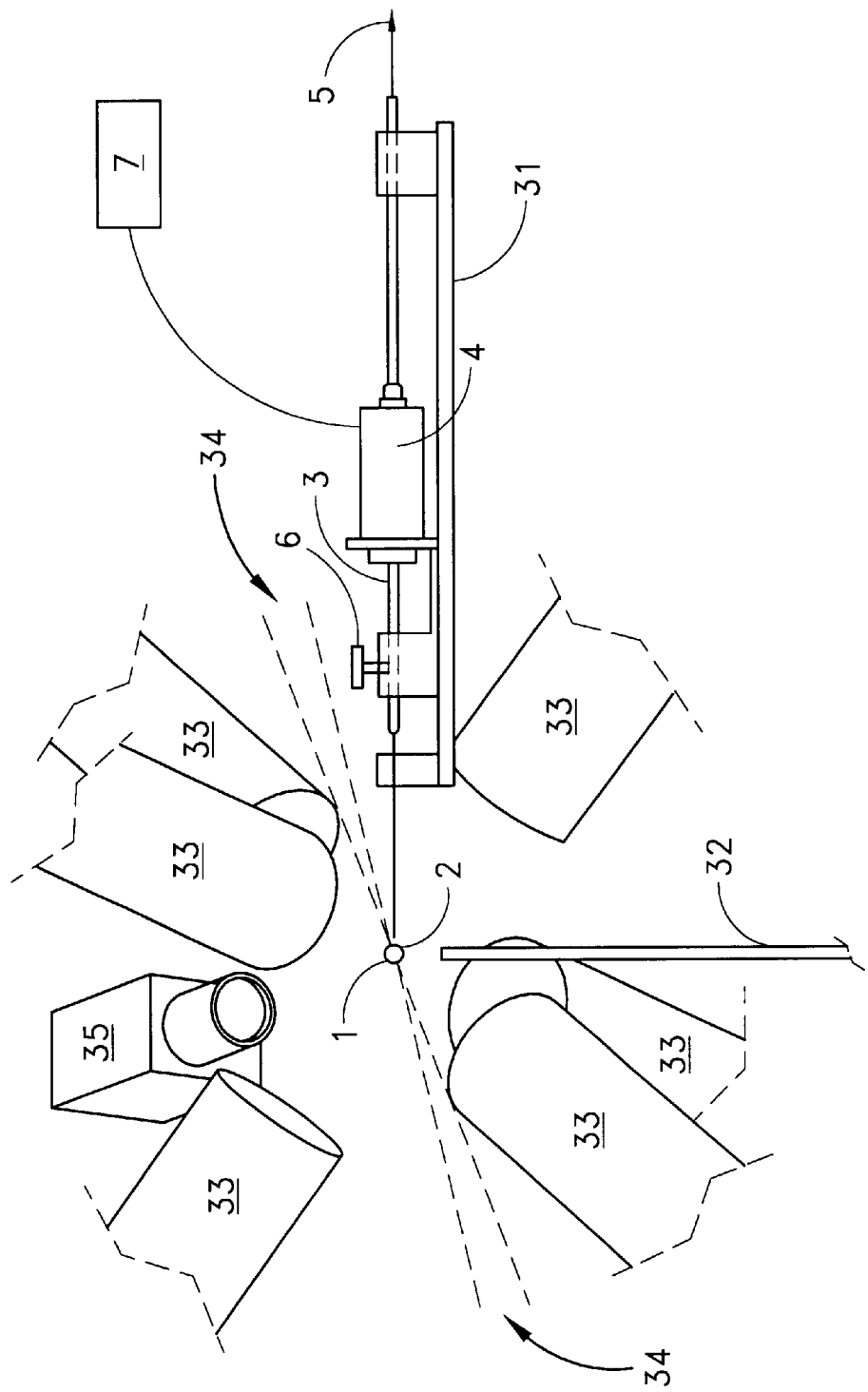

FIG. 16 depicts a preferred arrangement for drawing fibers from undercooled melts, under either contained or containerless melt conditions, utilizing the principles disclosed in WO 97/25284. It is important to note that a novel and critical feature of the stinger device of WO 97/25284 is that the fibers are not drawn through a die or similar forming device subsequent to formation. In this Example, containerless conditions are pictured, although the principles and the fiber drawing method may be used with any melt from which drawn fibers are desired, including contained melts.

The containerless conditions pictured in FIG. 16 are obtained by use of an aero acoustic levitator (AAL) to levitate liquid drops from which the fibers are drawn. This method utilizes aerodynamic forces from a gas jet 32, and the levitation is stabilized by application of acoustic forces from a three-axis acoustic positioning system 33. According to WO 97/25284, this and other means of levitating samples are described in the prior art, and the use of any means of levitating undercooled sample are intended to be within the scope of WO 97/25284. Such methods include, for example, electromagnetic levitation and electrostatic levitation. These means involve levitation and maintenance of the melt under high vacuum conditions, which allows for ready application of the fiber drawing methods of WO 97/25284 to metals, alloys, and materials that are sensitive to reaction with air or gaseous species present in a gas environment.

A levitated liquid drop 1 is formed by heating and melting a sample with the beam from a $CO_2$ laser, although it is contemplated that any heating means is within the scope of WO 97/25284, such as, for example, incandescent or arc lamps, microwave heating, induction heating, furnaces or levitation in a hot gas stream. In addition, any laser beam capable of providing sufficient heat to the sample may be used with the method of WO 97/25284. In this particular example, the $CO_2$ laser beam is split into two beams 34 that are focused onto opposite sides of the levitated sample, causing the sample to melt. The melt is then held at high temperatures until fully melted, and undercooling of the molten drop is then induced and maintained by switching off or reducing the incident heating power.

A stinger and fiber drawing device 31 consisting of a 0.01 cm diameter tungsten wire stinger 2 attached to a rod 3, which is operated with a solenoid actuator 4, is positioned so that the tip of the tungsten wire stinger is inserted into the levitated liquid drop 1 when the solenoid is actuated. Contact between the tungsten wire stinger and the undercooled melt must be carefully controlled to avoid heterogeneous nucleation of crystals in the undercooled melt due to contact with the stinger. While nucleation is not generally induced by the fiber drawing operation of WO 97/25284, problems related to heterogeneous nucleation may be alleviated if previously formed glass fibers are used as the stinger material. Although a tungsten wire is used as the stinger in this embodiment, WO 97/25284 anticipates that stingers of various materials and sizes will be utilized depending upon the melt composition, viscosity and desired fiber characteristics, and such other stingers are within the scope of WO 97/25284.

In this Example, a spring-operated drawing mechanism 5 provides the drawing force for the drawing of fibers of defined lengths, although any means of drawing the fiber is within the scope of WO 97/25284. The drawing force of the spring is adjusted so that its force constant is in the range $k=0.1–0.25$ lb/in. The fiber drawing rate is further controlled by a friction damper 6. An electronic control circuit 7 is used to initiate the solenoid actuator and hold the stinger in the liquid drop for a preset time before it is released to allow the fiber drawing operation. A high speed pyrometer 35 is used to monitor the levitated sample temperature which can be displayed in real time on a computer screen, as a graph of temperature vs time. The temperature of the molten drop is maintained at the desired undercooled temperature by increasing or decreasing the intensity of, or time of exposure of the sample to, the laser beam.

Of course, it is intended that the force constant of the spring and thus the fiber drawing rate may be adjusted as necessary in order to achieve fibers of the desired dimensions. In addition, it is intended that the fiber drawing means may be any suitable means, for instance, a motor and wheel assembly, and that the force of the drawing may be adjusted according to the physical properties of the fiber desired and the method used to draw the fibers.

Fiber drawing is initiated by first blocking the laser beam heating and monitoring the temperature of the liquid drop as it cools (displayed as a plot of temperature versus time on the computer screen). The solenoid actuator 4 is manually activated when the temperature reaches a pre-selected value, which is preferably within the optimal drawing temperature range. In this particular embodiment, the solenoid is designed to automatically turn off after stinging the specimen. The stinger is then withdrawn by action of the drawing mechanism, and a fiber is drawn from the liquid drop. The control of the temperature of the liquid drop is a critical part of the method of WO 97/25284. At temperatures higher than optimal temperature range for drawing fibers, the stinger is drawn out from the liquid drop without drawing a fiber. At temperatures lower than the optimal temperature range, the viscosity of the liquid is so high that the force exerted by the stinger on the liquid drop must be increased to the point where the force exceeds the restoring force of the levitation device, and the stinger motion serves to push or draw the liquid drop out of the levitated position rather than drawing a fiber from the liquid. In addition, if the melt temperature is too low the resultant fibers will be shorter than desired. At intermediate, undercooled temperatures, fibers of various lengths may be formed, with diameters ranging from less than 1 micrometer to over 60 micrometers.

While a certain range of fiber sizes is reported in this Example, it is contemplated that fibers with a wide range of sizes may be produced, depending upon the drawing conditions. The diameter of the fibers is larger when drawing occurs at a lower velocity. The diameter of the fibers is smaller when drawing occurs at a higher velocity. The length of the fibers are limited by two effects. First, at lower temperatures, the forces on the liquid drop will eventually pull the liquid drop out of its levitated position. Second, at higher temperatures, the fiber diameter decreases as the pulling rate increases so that the tensile forces no longer overcome the surface tension forces and the pulling of a fiber from the liquid is terminated. Within the proper drawing temperature range, fibers of extremely long lengths may be drawn. For example, drawing a 10 micrometer diameter fiber until a 0.35 cm diameter drop is reduced to 0.25 cm diameter results in a fiber which is more an 18,000 cm long.

Figure 17:
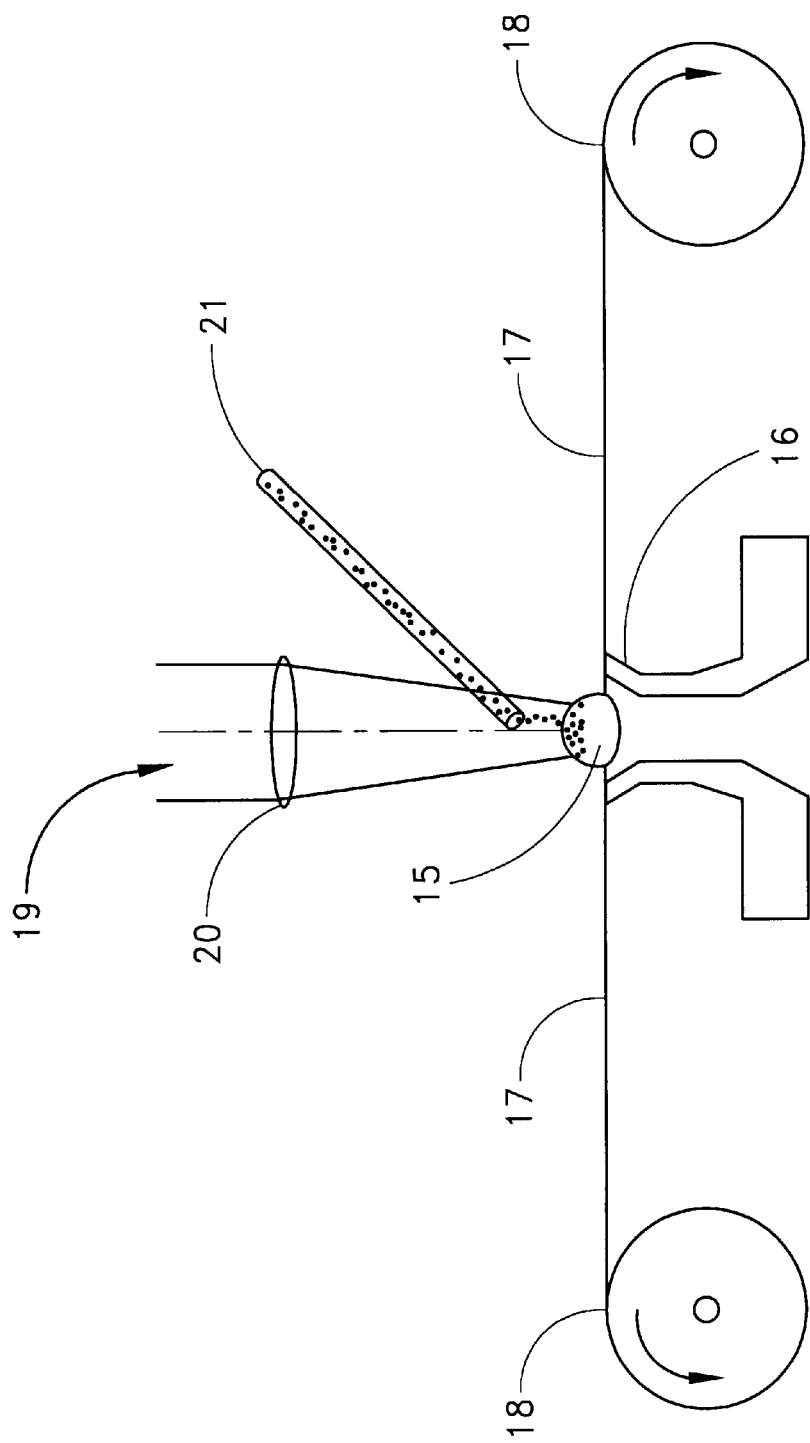

FIG. 17 illustrates a preferred method in accordance with the principles of WO 97/25284 of drawing fibers from more than one direction from a suspended liquid drop under containerless conditions. In this method, a levitated liquid drop 15 is initially formed in a levitation nozzle 16 or using another levitation melting technique. Fibers 17 are simultaneously drawn in opposite directions from opposite sides of the liquid drop by the action of motors and wheels 18 or other drawing devices that will allow control of the stinger operation and the fiber drawing rate. The drawing forces are opposed and can be controlled to make them nearly equal and opposite so that the resulting force on the liquid drop will be reduced and the drop will not be drawn away from its initial position. The figure also illustrates heating by a laser beam 19 or other radiant heat source that is focused with a lens 20 onto the top surface of the levitated liquid drop. The temperature in the heated region can be maintained above the melting point, while the temperature will decrease in other regions of the liquid drop, and can be undercooled at the sides of the liquid drop sufficiently to permit fiber drawing. The fiber material removed from the drop can be replenished by adding and melting solid material 21 in the radiantly heated region, which may be added to the levitated liquid in controlled rates as a stream of powder or one or more thin rods of solid material. By incorporating control of the fiber drawing rate, addition and melting of material at the radiantly heated region, maintaining an undercooled region from which to draw fibers, a continuous process can be achieved to make long and continuous fibers. Of course, the method disclosed in WO 97/25284 contemplates the drawing of single fibers from a single direction or the drawing of multiple fibers from multiple directions drawn from positions which do not significantly displace the melt from its levitated position.

Stinger conditions and operation include priming the stinger by contact with the melt at temperatures above the melting point prior to its use in drawing fibers from the undercooled melt, and the time that the stinger is allowed to be in contact with the molten drop (typically 1–50 milliseconds, although the priming time may vary depending upon the stinger, composition of the melt and viscosity of the melt), the distance the stinger is inserted into the melt and the rates of stinger insertion into, and withdrawal from, the melt. If the temperature is too high, nucleation by the stinger may be avoided by rapid insertion/withdrawal of the stinger, but the velocity of drawing must not be too high to draw a fiber from the melt. At the appropriate undercooled temperature, the viscosity of the melt increases to where fibers may be drawn, and the rate of crystallization decreases to a rate lower than that observed near the melting point of the material.

EXAMPLE 2

Fiber Drawing Using the Conical Nozzle Levitator

Figure 18:
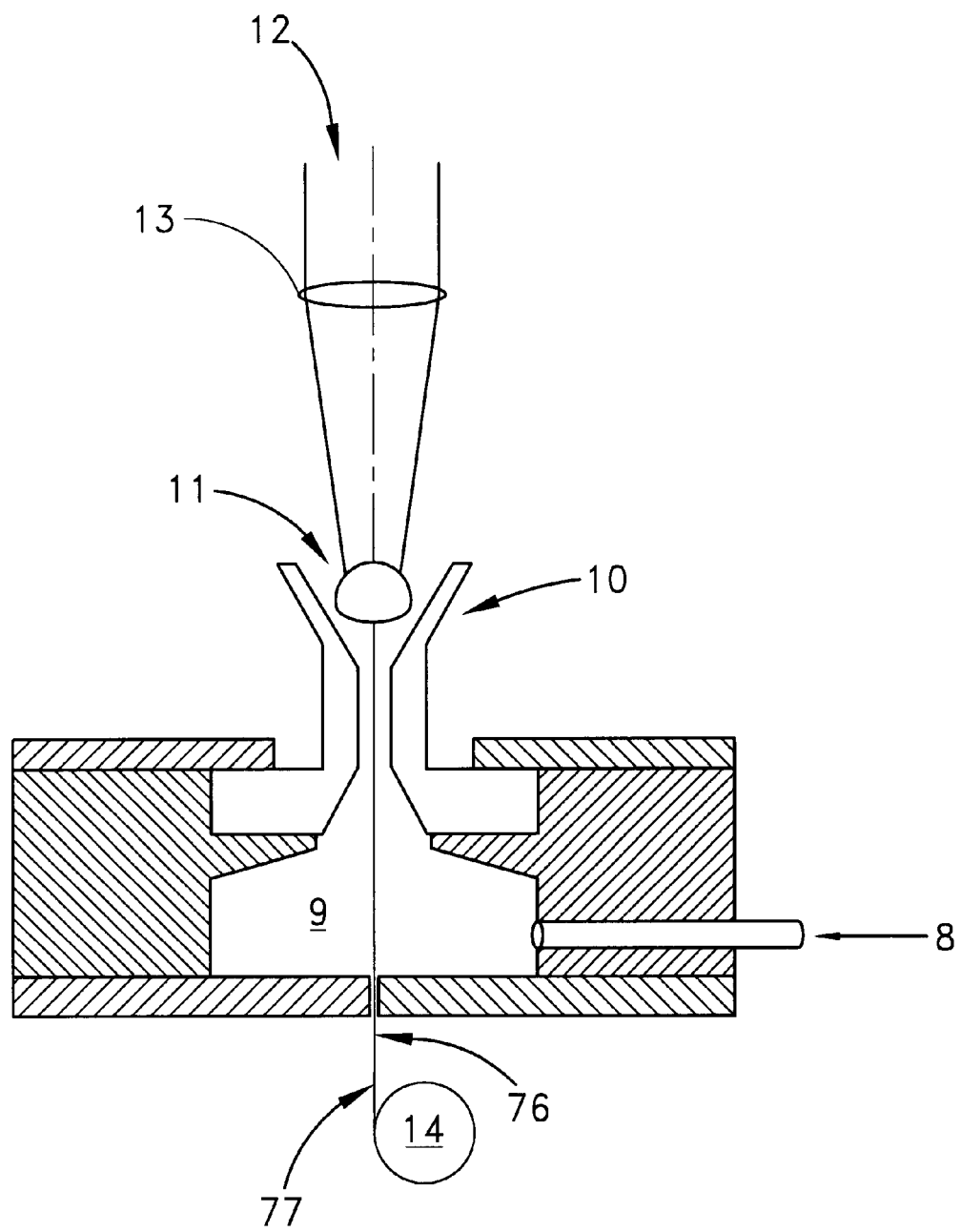

FIG. 18 shows the arrangement for drawing fibers from melts using a motor and wheel assembly and a conical nozzle levitation (CNL) device, to levitate and draw fibers from 0.25–0.40 cm diameter specimens, although larger specimens may be levitated depending upon their surface tension and density. A levitation gas flow 8 passes through a plenum chamber 9, through the nozzle 10 and over the levitated specimen 11. The levitated specimens are heated and melted with a $CO_2$ laser beam 12 focused with a ZnSe lens 13 onto the top surface of the specimen. The temperature of the specimen is controlled by blocking the laser heating beam using any available means of signal blocking or by changes in the laser power. Fibers 76 are drawn from the bottom surface of the undercooled melts, using a tungsten wire stinger 77 that is fed through the nozzle and driven by a reversible stepper motor and wheel assembly 14. The stinger comprises a long tungsten wire attached to the wheel, which is wound onto the wheel as the fiber pulling occurs. Of course, it is contemplated that other lasers may be used to heat the specimen, for example, a continuous wave Nd-yttrium-aluminum-garnet (Nd-YAG) laser. Of course, any heating method, in addition to lasers, may be used which will effectively melt the materials and not interfere with the drawing operation. It is also contemplated that any means of powering the drawing process may be used, in addition to the stinger method of Example 1 and the stepper motor and wheel assembly described above.

The direction and acceleration of the motor and wheel assembly 14 are computer-controlled to operate the stinger, to vary the acceleration of the fiber pulling rate, and to achieve a constant fiber pulling rate. A high speed pyrometer is used to monitor sample temperature and observe cooling behavior. The stinger and resultant fibers are spooled onto the wheel attached to the motor 14, without undergoing further mechanical processing, such as drawing through a die. In this embodiment, fibers are drawn at velocities up to 120 cm/second, although the fiber-drawing velocity is dependent upon the individual means used to power the drawing (here, the motor and wheel). The acceleration of the stinger is computer controlled and an acceleration equal to 1200 cm/sec$^2$ is used, although WO 97/25284 contemplates that other acceleration rates may be used depending upon the particular material to be drawn and the desired fiber characteristics. Fibers of up to 60 cm long and with uniform diameters of 5–20 micrometers may be drawn with this apparatus, although other lengths and diameters may be obtained by using different drawing conditions. The stinging and fiber drawing operations are typically completed in a period of less than 0.6 second, although the time may vary depending upon the viscosity of the melt, the rate of crystallization and the rate at which fibers are pulled. It is necessary to initially pull the fiber at a rate at which contact of the melt with the stinger does not induce crystallization of the melt.

Fiber drawing with the CNL device may be initiated and continued at lower temperatures than with the AAL device described in Example 1, above, because the liquid specimen is not drawn away by the fiber when the drawing force is large. At lower temperatures when the viscosity of the melt is larger, and at higher drawing rates where the fiber drawing force is larger, the drawing force becomes sufficient to displace the melt so that the melt makes contact with the sides of the levitation nozzle. Crystallization of the melt is induced by this contact with the nozzle, however, drawing of fibers continues until the melt crystallizes up to the point of fiber drawing. At temperatures where the drawing force is sufficiently large for the melt to make contact with the nozzle, the crystal growth rate was typically low enough so that the center of the specimen remains liquid for a period of time sufficient to draw continuous fibers of lengths greater than 60 cm.

For example, at lower temperatures where liquid drops of the mullite or yttrium-aluminum garnet (YAG) composition were displaced under a drawing velocity of 120 cm/second to make contact with the nozzle, the crystal growth rates are substantially less than 1 cm/second. The points of contact between the liquid and the nozzle were approximately 0.2 cm from the point at which fibers were drawn. Therefore, the fiber drawing continued for a period greater than 0.2 second after contact with the nozzle to yield fibers of lengths between 24 and 60 cm long. The approach of allowing the undercooled liquid to come in contact with a mechanical restraining device, as a result of displacement by the fiber drawing force, may thus be used to pull fibers of useful lengths. Surprisingly, crystals nucleated by contact with the mechanical restraining device propagate at limited rates and do not interfere with continued drawing of fibers until these crystals reach the point at which fibers are drawn from the liquid.

The cooling rate of the drawn strand may be estimated. For example, for a fiber which is 10 micrometers in diameter and drawn in air at a rate of 100 cm/second using the CNL device, the cooling rate is calculated as follows.

For example, consider a liquid oxide drop whose temperature is 1500 degrees C. The thickness of the thermal boundary layer at the liquid drop is considerably less than the specimen diameter at the stagnation point of the levitation gas flow, which is the same point at which the fiber was drawn from the liquid. For a typical 0.3 cm diameter liquid drop and 100 cm/second drawing rate, the fiber material was drawn through the boundary layer in less than 0.003 seconds. Assuming that the fiber material maintains thermal equilibrium with the gas, the cooling rate would be on the order of 500,000 degrees C./second. This cooling rate would occur if the heat flux at the fiber surface is approximately 700 watt/cm$^2$ as calculated from the enthalpy change rate of the 10 micrometer diameter fiber per unit surface area, and based on the thermal properties of aluminum oxide, for example.

Now assume that the fiber remains hot. The convective heat flux q" from a fiber at 1500 degrees C. to the cold ambient gas is given by:

$$q'' = \frac{Nu_h k_f (T_f - T_a)}{d}$$

where, $T_f$ and $T_a$ are the fiber and ambient temperatures, $k_f$ is the gas thermal conductivity at the mean gas "film" temperature=$(T_f+T_a)/2$, d is the fiber diameter, and $Nu_h$ is the Nusselt number for heat transfer.

For the assumed conditions, $k_f$ is approximately $4\times10^{-4}$ watt/(cm degree C.), $Nu_h$ is approximately 1, and q" is approximately 600 watts/cm$^2$. Thus, the assumption that the fiber does not cool leads to a heat flux comparable to that required to maintain thermal equilibrium with the ambient gas. It may therefore be concluded that the CNL fiber drawing method achieves cooling rates in the drawn fiber of several 100,000 degrees C./second for fibers of 10 micrometer diameter. For larger diameter fibers, the cooling rate is smaller, in approximate proportion to the square of the fiber diameter. Thus cooling rates in excess of 4,000 degrees C./second will occur for fibers of 50 micrometers in diameter.

EXAMPLE 3

Drawing Fibers from Mullite Melts

Figure 19:
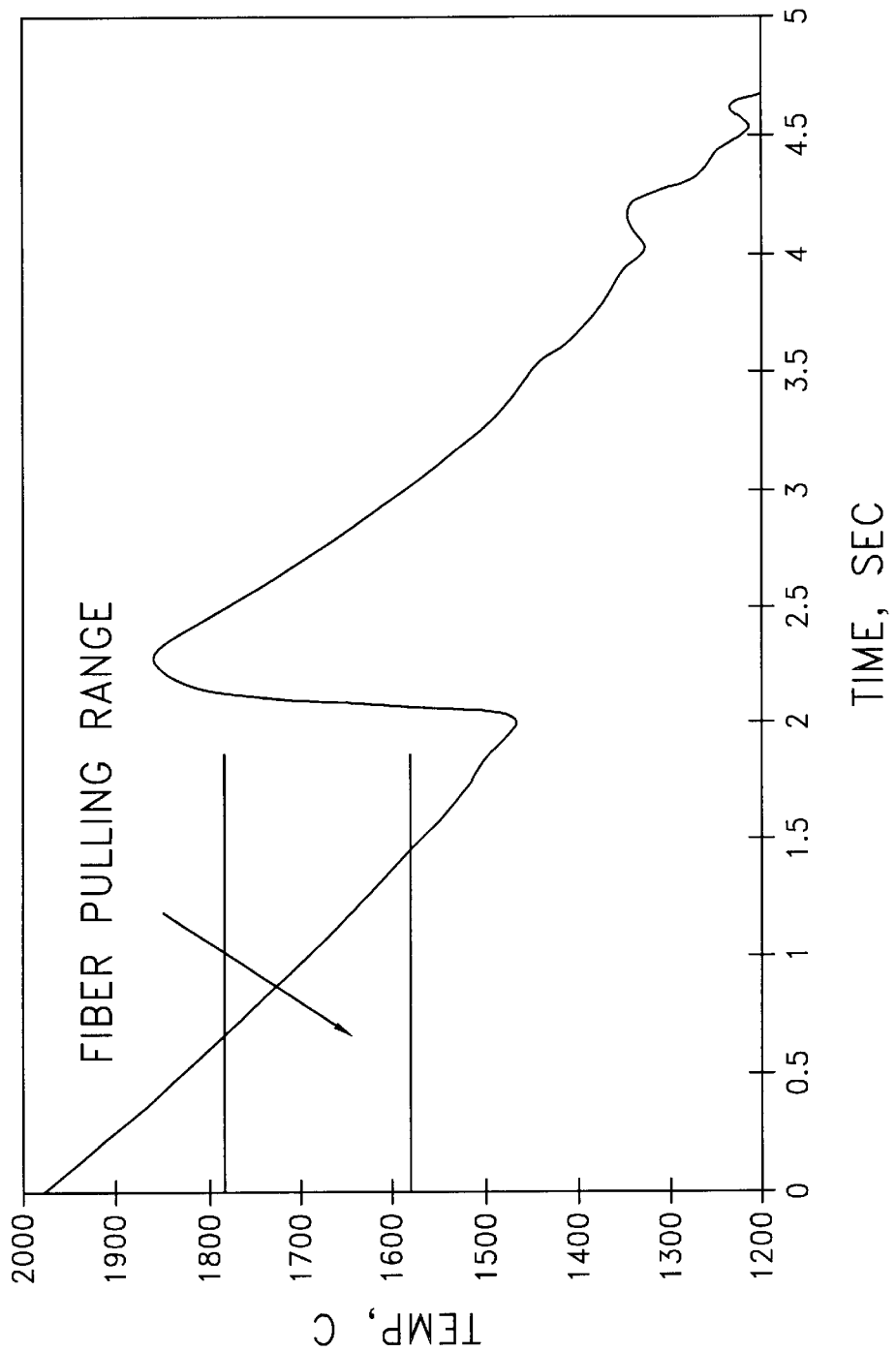

FIG. 19 illustrates the time and temperature conditions under which fibers are drawn from undercooled melts of the mullite composition, 60:40 mole fraction of $Al_2O_3:SiO_2$, using the fiber drawing methods of WO 97/25284.

FIG. 19 shows the typical temperature-time history of a levitated sample during fiber drawing experiments as a plot of the temperature measured with the optical pyrometer as a function of time. Prior to the illustrated time period, the specimen is melted with a $CO_2$ laser beam and simultaneously levitated in an AAL apparatus in a flow of argon gas, and held at a constant temperature. The temperature range for fiber drawing is determined by drawing fibers at various temperatures using the fiber stinging and drawing device illustrated in FIG. 16 and described in Example 1. The decrease in temperature with time from 0 to 2.0 seconds of the recorded time interval shows cooling of the liquid upon blocking of the laser heating beam. The temperature range in which fibers may be successfully drawn from the undercooled liquid during this cooling period is indicated on the figure. During the period approximately 2.0 to 2.2 seconds, a rapid temperature increase up to the melting point of the sample is shown. This temperature increase occurs when the undercooled liquid crystallized spontaneously. The energy released by crystallization is sufficient to heat the sample up to the melting point where the temperature remained approximately constant while crystallization continued. Finally, the temperature decreases due to heat loss from the solid specimen after all of the liquid is consumed.

Figure 22:
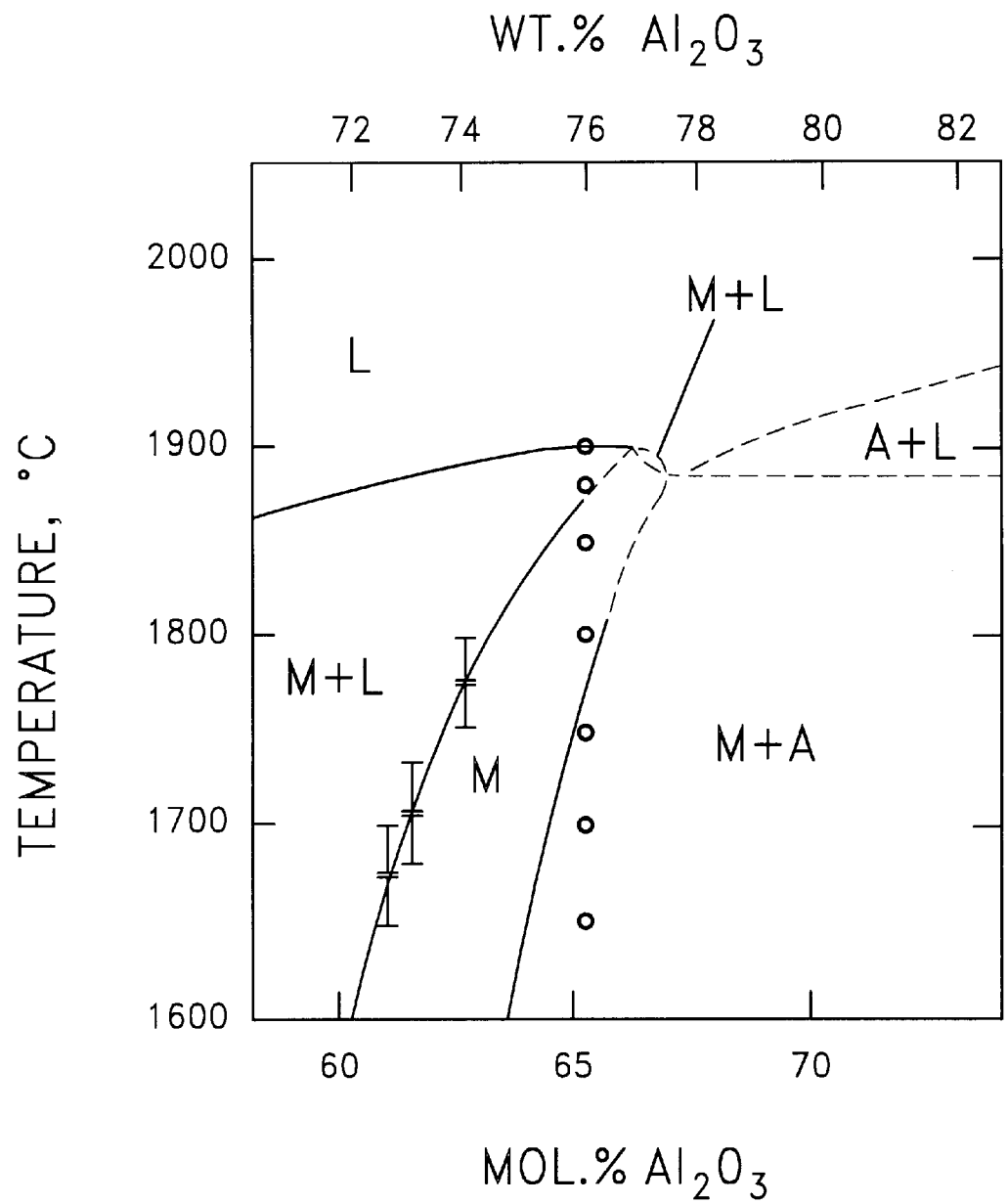
Figure 23:
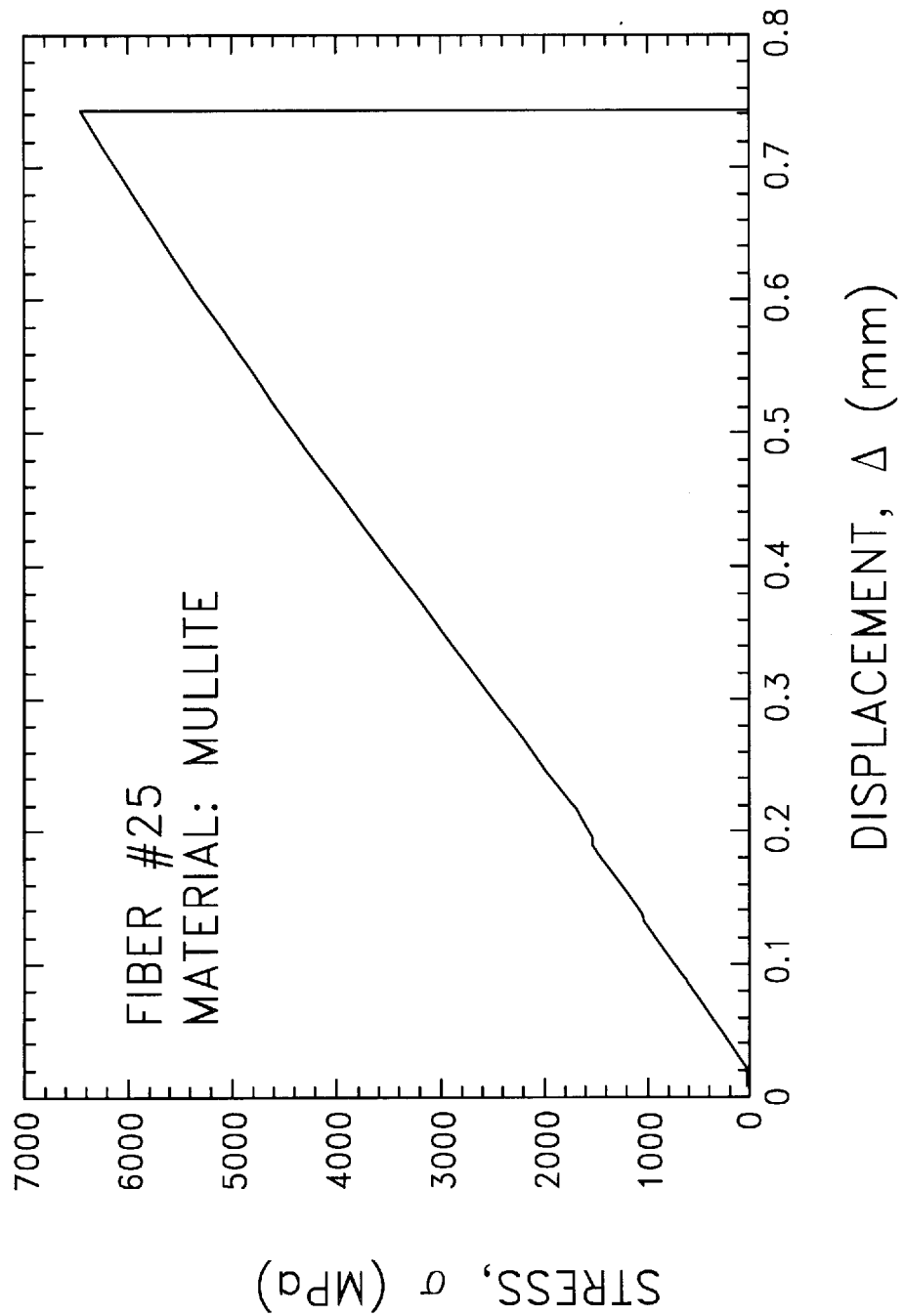

As seen in FIG. 22, the composition of crystalline mullite that is in equilibrium with liquid at higher temperatures is not contained within the mullite phase field at lower temperatures. The diagram thus shows that mullite formed at equilibrium with the liquid at the highest temperatures will not be thermodynamically stable at lower temperatures. The mullite in equilibrium with the liquid at higher temperatures will contain an excess of aluminum oxide, which will tend to precipitate a second phase when the mullite is cooled or used in an application at lower temperatures. In contrast, the composition of the glass fibers formed in accordance with the principles of WO 97/25284 can be independently chosen to be within the mullite phase field at the intended application temperature. The glass fibers can be heated to convert them to pure crystalline mullite fibers which are stable with respect to precipitation of a second phase at the application temperature.

It is also possible to draw glass fibers in many cases where recalescence (heat released by the crystallization resulting in a temperature increase to the melting point) is observed. For example, glass fibers of the mullite composition may be obtained as described in this Example even where recalescence is observed.

EXAMPLE 4

Fibers Drawn from Undercooled Melts Using Contained Systems

Figure 21:
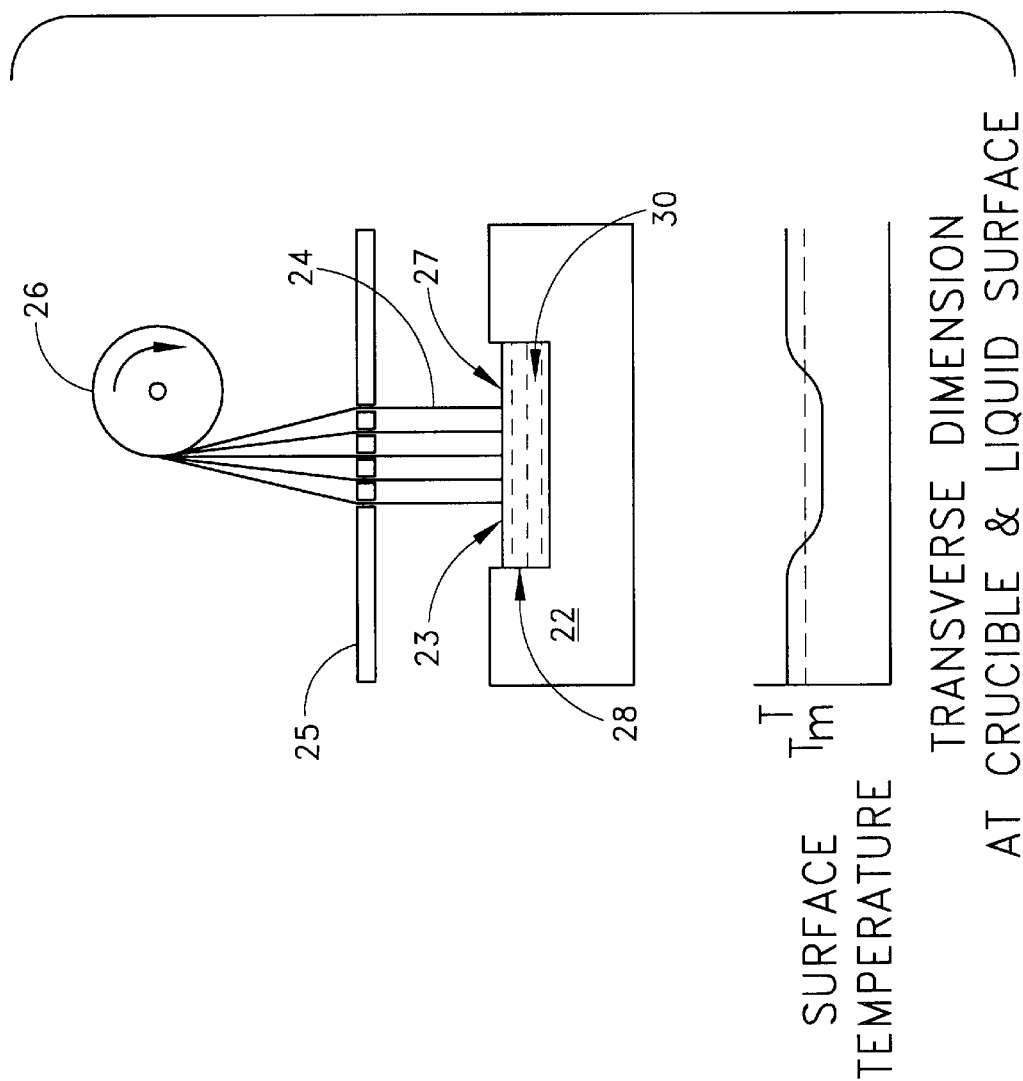

The description in WO 97/25284 also contemplates fibers drawn in contained systems. FIG. 21 illustrates a preferred embodiment of a method of supporting a liquid using a container which facilitates fiber drawing from undercooled melts without recrystallization. An important feature of the method includes establishing and maintaining a temperature gradient within the container, such that part of the molten mass is undercooled. In this method, the material of interest 30 is placed within an open container 22 such as a crucible, which container is maintained at a temperature above the melting point. A cover 25, also maintained at a temperature above the melting point, may be initially placed on the container to achieve thermal equilibrium inside the container and complete melting of the material. The cover may then be raised or removed, permitting heat loss and cooling of the melt surface. The heat transfer conditions at the melt surface 23 can be controlled so that the central region of the exposed melt surface is undercooled, permitting the drawing of fibers from the undercooled liquid. The inner walls of the container 28 and a small part of the liquid 27, in close proximity to the walls of the container can be maintained above the melting temperature so that heterogeneous nucleation of crystals cannot occur at the walls.

FIG. 21 shows the heating crucible 22 and the molten material 30 from which several fibers 24 may be drawn through openings in the raised cover 25 that are larger than the fibers or through openings in a separate guide, by the action of, for example, a motor and wheel 26 or other drawing means. The fiber material removed from the melt can be replenished by adding and melting solid material in the region where the melt temperature exceeds the melting point. Drawing is initiated by the use of one or more stingers (not shown) as described in Example 1 above, and by action of the motor and wheel assembly or other drawing means.

The temperature at the top surface of the liquid and of the crucible is schematically illustrated in the bottom part of FIG. 21 as a function of the transverse position at the top surface of the crucible and contained liquid. The equilibrium melting temperature is designated by $T_m$ on the ordinate of this part of FIG. 21. The temperature of the crucible and of that part of the liquid near the crucible walls is above $T_m$, while the temperature of the liquid surface further from the container walls decreases to a value less than $T_m$. The temperature at the center of the exposed liquid surface can be estimated as follows, assuming the diameter of the container is much larger than the depth of liquid, so that heat is conducted to the surface from the bottom. For purposes of estimating the magnitude of the temperature gradient, it is also assumed that convective heat loss is negligible, that heat is lost from the liquid surface only by radiation, and that radiant heat is not reflected back onto the liquid surface. The temperature decrease in the liquid is then approximated by the equation below, where the right side gives the heat flux from the bottom surface, which is maintained at the crucible temperature, to the top surface of the liquid, and where the left side gives the radiant heat loss from the liquid surface:

$$\sigma \varepsilon T_s^4 = k \frac{T_c - T_s}{h}$$

where $\sigma=5.67\times10^{-12}$ watt/($cm^2$ degrees $K^4$), the Stefan-Boltzmann constant, $\varepsilon$ is approximately 0.8 for liquid oxides, the emissivity of the liquid surface, $T_S$, is the temperature of the liquid surface, $T_c$, is the temperature of the crucible, and h is the depth of the liquid layer.

Typical values for the thermal conductivity, k, of oxides at high temperatures are in the range 0.02 to 0.2 watt/(cm degree C.).

Using mullite as an example, with $T_c=1,900$ degrees C. (slightly above the melting point) and $T_s=1,670$ degrees C.

(approximately 200 degrees C. of undercooling), Nordine, et al., obtained h=0.045 to 0.45 cm, depending on the actual value of k.

The above calculation shows that an estimated liquid depth of less than 0.5 cm is sufficient to obtain deep undercooling at the surface of liquid in a container maintained above the melting point. This depth is small enough that the assumption of a liquid depth much less than the diameter of the container can be readily satisfied.

EXAMPLE 5

Effect of Gaseous Environment and Recalescence

The degree of undercooling, the formation of bulk glass, and the conditions for fiber drawing were found to depend on the gaseous environment. In this Example, fiber drawing under three different gaseous environments are reported: air, pure oxygen, and pure argon gas. It is contemplated that other gases may be utilized, however, such as, for example, nitrogen, helium, carbon monoxide, carbon dioxide, hydrogen and water vapor, among others.

For example, bulk glass of the $Y_3Al_5O_{12}$ composition may be formed in argon, without crystallization. In air or oxygen, the liquid $Y_3Al_5O_{12}$ composition crystallizes spontaneously when it is undercooled. A second example is provided by pure aluminum oxide, for which the liquid could be cooled to 450 degrees C. below the melting point in argon and only 360 degrees C. below the melting point in air or oxygen, before spontaneous crystallization occurred. The heat released by the crystallization results in recalescence. It is possible to draw glass fibers in all cases where bulk glass samples are formed and crystallization does not occur when the melt is cooled. It is often possible to draw glass fibers in many cases where recalescence is observed. For example, in an oxygen environment, glass fibers of the mullite composition may be obtained where recalescence was also observed. These fibers were drawn from the undercooled melt at temperatures above the temperature at which crystals nucleated from the melt and spontaneous crystallization of the melt occurred.

Typical bulk liquid cooling rates were 100–500 degrees C./second under conditions that resulted in spontaneous crystallization of the undercooled melt with recalescence. It is known that glass formation from a melt will occur if the cooling rate exceeds the critical cooling rate for glass formation; thus the observation of recalescence indicates that the critical cooling rate was not achieved in the bulk liquid. However, glass fibers may still be obtained by drawing the fibers when the liquid temperature is greater than the temperature at which spontaneous crystallization occurred. These results demonstrate that the process of drawing a fiber results in a cooling rate in the fibers that exceeds the free cooling rate of the liquid drop.

EXAMPLE 6

Novel Fiber Compositions

Table II lists the compositions of some of the novel fibers which may be obtained using the methods of WO 97/25284. The fibers listed in Table II may be drawn using a variety of methods, including the stinger and drawing device described in Example 1 and the stinger and motor wheel assembly shown in FIG. 18 and described in Example 2. Melts may be suspended using any levitation means, including both the AAL and the CNL devices described above, or melts may be contained as described, for example, in Example 4 above.

The solid samples are formed from the pure elemental oxides by laser-hearth melting, a process which is well-known in the art. Additives of neodymium or erbium are used with the 50:50 $Al_2O_3$:$SiO_2$, the 63:37 $Al_2O_3$:$Y_2O_3$, and other materials.

For temperatures at or above the melting points, oscillations and fluid flow observed in the levitated melts indicate that the melts are of a low viscosity, comparable to the viscosity of liquid aluminum oxide and much less than the viscosity of typical glass-forming materials such as pure silicon dioxide or silica-rich melts. The low viscosity of these melts is also shown by the fact that fibers could not be drawn from the melts at temperatures above the melting point. However, in all cases described herein, drawing of glass fibers may be achieved from undercooled melts using the methods of WO 97/25284. The glass fibers drawn from the melts in all cases are uniform in appearance. Visual examination under a microscope reveals no evidence of precipitation of secondary phases in the fibers.

The synthesis of glass fibers with large concentrations of optically-active dopants may be obtained by adding $Nd_2O_3$ and $Er_2O_3$ to the 50:50 $Al_2O_3$:$SiO_2$ and the 63:37 $Al_2O_3$:$Y_2O_3$ materials. The additive concentrations used are much larger than the typical concentrations of 1% or less in prior art fibers. The method of WO 97/25284 achieves these fibers with large additive concentrations by first heating the material to a temperature where all components form a completely melted liquid. Upon undercooling, the viscosity increases sufficiently so that glass fibers may be drawn from the melt. Since the undercooled melt does not crystallize, it remains homogenous allowing the glass fibers with high concentrations of the additives to be formed.

In addition, the synthesis of very high purity fibers and fibers with extremely small concentrations of additives is also possible. The use of containerless conditions to maintain the melt allows the melt to be purified by (i) evaporation of the impurities and (ii) reactive gasification of the impurities. For example, aluminum oxide which initially contains about 0.0005 molar percent of chromium (5 parts per million chromium) may be purified by containerless melting and heating of the liquid to temperatures up to 2400 degrees C. The analyzed chromium concentration is reduced by factors up to 1 million times in a few minutes of processing. Similarly, purification of many oxides by evaporation is possible by means known in the prior art. When materials are processed at very high temperatures in a container, the dissolution of container material in the melt will prevent purification of the liquid. Therefore, by purifying the liquid under containerless conditions, fibers containing less than 0.0001 molar percent (1 part per million) of impurities can be formed. Similarly, by first purifying the liquid, additives may be used to achieve controlled additive concentrations in the range from less than 0.0001 molar percent up to 50 molar percent in fibers pulled from the liquid.

Glass fibers with the chemical composition $CaAl_2O_4$ are synthesized under containerless conditions according to the methods of WO 97/25284, undercooling the melt sufficiently so that fibers could be drawn. The method of fiber pulling is that depicted in FIG. 18, and levitation is in oxygen gas. The fibers are pulled from a melt that is undercooled to a temperature approximately 200 degrees C. below the melting temperature of the material. Upon further undercooling, crystallization does not occur and bulk glass samples of $CaAl_2O_4$ were obtained. It is anticipated that other methods of fiber pulling may be used, for example, the stinger drawing device shown in FIG. 16, and any method which results in pulled fibers is contemplated to be within the scope of WO 97/25284.

Using the methods of WO 97/25284, glass fibers may be synthesized from CaO—$Al_2O_3$ melts, which fibers may be used as bio-compatible structural materials which will not cause silicosis if inhaled, as disclosed in U.S. Pat. No. 5,552,213, the disclosure of which is incorporated herein.

Using the methods of WO 97/25284, glass fibers may also be formed with the chemical composition of the mineral forsterite, $Mg_2SiO_4$. This mineral is thermodynamically compatible with the mineral enstatite, $Mg_2Si_2O_6$, which is known in the prior art to be an interphase weakening coating for use in toughening composite materials. The forsterite fibers are formed using the fiber-stinger device illustrated in FIG. 16 and from melts levitated and undercooled in the conical nozzle levitation device.

Figure 20:
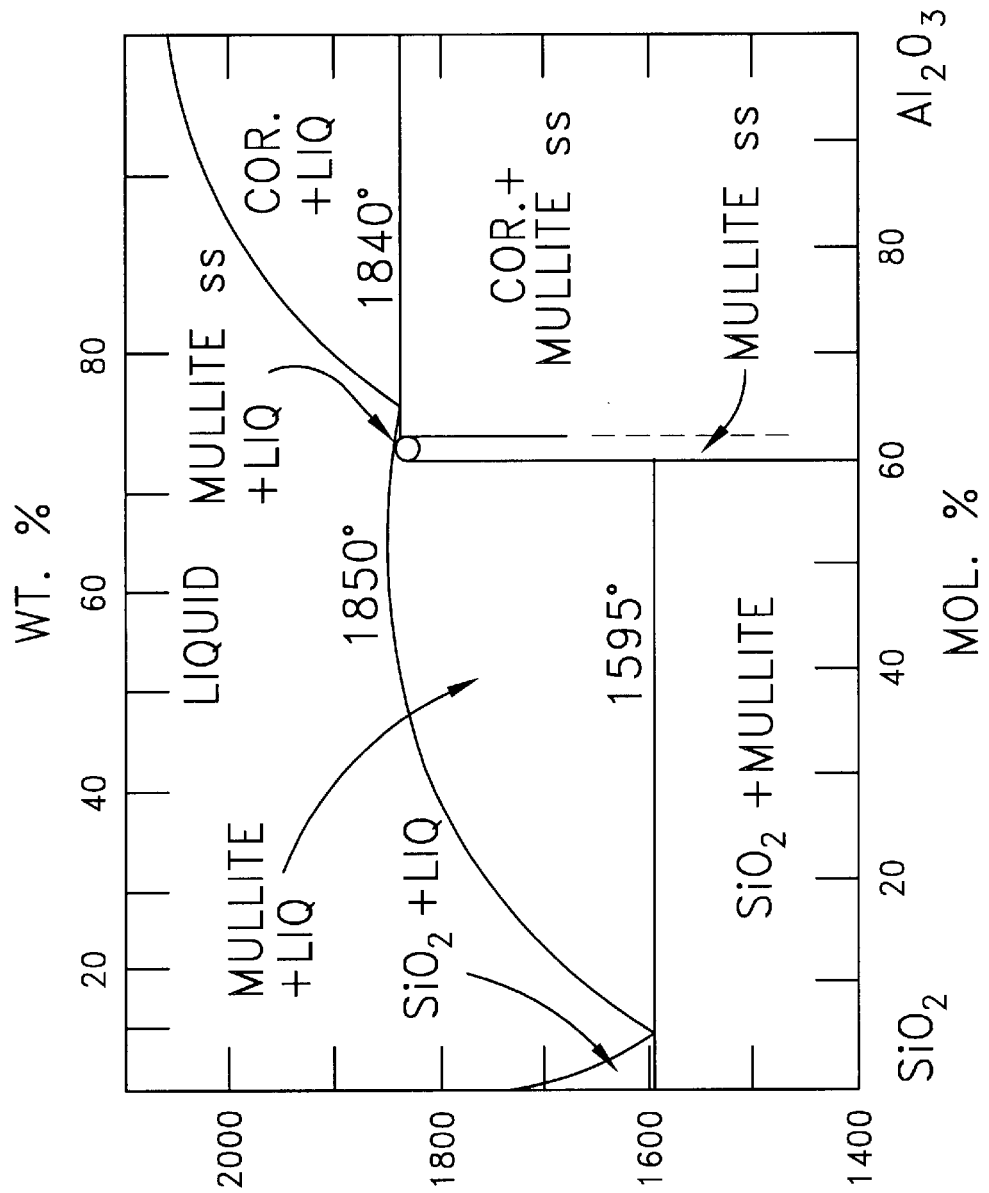

FIG. 20 shows the equilibrium phase diagram of the alumina-silica system, illustrating the full range of compositions between pure silicon oxide and aluminum oxide. It can be seen in Table II that the work disclosed in WO 97/25284 achieved glass fiber formation over a wide range of compositions that includes compositions for which pure mullite is stable at lower temperatures.

EXAMPLE 7

Crystallization of Fibers

Fibers made according to WO 97/25284 may also be crystallized. Table III reports the crystallization of mullite composition glass fibers, e.g., 60:40 $Al_2O_3$:$SiO_2$ at temperatures of 1100 degrees C. and 1200 degrees C. These results demonstrate that the process of drawing glass fibers from an undercooled melt, followed by heating to an intermediate temperature, yields crystalline fibers with controlled chemical compositions that are stable at the intermediate temperatures.

The fiber drawing rate is controlled to typically exceed the crystallization velocity of the undercooled melt, and the cooling rate achieved in the fibers is typically greater than the critical cooling rate for glass formation in the materials that were drawn into fibers. The crystallization velocities or the critical cooling rates for glass formation are not precisely known as a function of temperature. For mullite fibers, a fiber drawing rate of 30 cm/s is sufficient to avoid melt crystallization. The crystallization velocity of mullite is approximately 3 cm/s at 200K below the melting point.

The crystallization velocity is greater for liquid yttria-alumina than for liquid mullite compositions. Yttria-alumina glass fibers of a few mm in length were drawn at 30 cm/s and fibers up to 60 cm long were drawn at 100 cm/s, using the motor and wheel assembly depicted in FIG. 18, in a flow of pure argon gas. The liquid was cooled to approximately 200 degrees C. below the melting point.

As shown in Example 2, the cooling rate achieved in the fibers will decrease as the fiber diameter increases. The drawing rate required to obtain fibers with a given diameter will also decrease as the fiber diameter increases. Thus, in the drawing of large diameter fibers, conditions may occur in which the cooling rate achieved in the fibers is less than the critical cooling rate for glass formation. The fibers obtained under this condition will then contain at least some crystalline material. Further, if the crystallization velocity under the fiber drawing conditions exceeds the fiber drawing rate, the crystals formed in the fiber will propagate in the fiber to cause crystallization of the undercooled liquid from which the fibers are formed, thus terminating the fiber drawing process.

Table III presents tensile test data for glass fibers drawn from undercooled melts and for crystalline fibers formed by heating the drawn fibers in air. It is of interest to note that the fibers as-pulled have very high tensile strengths. The tensile strengths of commercially available prior art fibers with similar compositions is limited to less than 3 GPa, compared with the tensile strength values of up to 6.4 GPa in fibers of the mullite composition obtained in accord with the principles of WO 97/25284.

TABLE II

Chemical composition of glass fibers pulled from undercooled melts.

| Chemical composition, mol fractions | Additives |
|---|---|
| Alumina-silica materials: | |
| 0.50 $Al_2O_3$ + 0.50 $SiO_2$ | $Nd_2O_3$, 1% to 20% by weight |
| 0.50 $Al_2O_3$ + 0.50 $SiO_2$ | $Er_2O_3$, 1% to 20% by weight |
| 0.50 $Al_2O_3$ + 0.50 $SiO_2$ | |
| 0.60 $Al_2O_3$ + 0.40 $SiO_2$ | |
| 0.67 $Al_2O_3$ + 0.33 $SiO_2$ | |
| 0.69 $Al_2O_3$ + 0.31 $SiO_2$ | |
| 0.70 $Al_2O_3$ + 0.30 $SiO_2$ | |
| 0.71 $Al_2O_3$ + 0.29 $SiO_2$ | |
| Alumina-yttria materials: | |
| 0.63 $Al_2O_3$ + 0.37 $Y_2O_3$ | $Nd_2O_3$, 5 mol % substituted for $Y_2O_3$ |
| 0.63 $Al_2O_3$ + 0.37 $Y_2O_3$ | |
| Other materials: | |
| 0.50 $Al_2O_3$ + 0.50 CaO | |
| 0.30 $Al_2O_3$ + 0.70 CaO | |
| 0.67 MgO + 0.33 $SiO_2$ (Forsterite) | |
| 0.50 $Al_2O_3$ + 0.50 $La_2O_3$ | |
| 0.35 $Al_2O_3$ + 0.35 LiO + $SiO_2$ | |

TABLE III

Properties of Mullite-Composition Fibers

| Fiber Condition | Fiber Diameter, _m | Tensile Fracture Strength, GPa |
|---|---|---|
| As-Pulled | 32.0 | 6.45 |
| As-Pulled | 20.5 | 4.68 |
| As-Pulled | 32.7 | 5.21 |
| As-Pulled | 30.5 | 6.14 |
| As-Pulled | 33.0 | 5.55 |
| Crystallized at 1100_C. | 19.0 | 0.78 |
| Crystallized at 1200_C. | 8.0 | 1.00 |
| Crystallized at 1200_C. | 28.0 | 0.66 |

Description of Alternative Host Fiber Materials

Most crystalline oxide laser hosts have not been fabricated in an amorphous form, and therefore the optical properties of the respective amorphous forms have not been tested. No data is presently available in the literature concerning the optical properties of such hosts. In particular, the literature does not suggest the fluorescence bandwidth of the amorphous form. Applicants have studied the reported fluorescence spectrum of many erbium-doped laser crystals, and Applicants have used the fluorescence spectrum of erbium in a given crystal as information to initially predict the fluorescence bandwidth of the corresponding amorphous forms of the respective materials. For example, if $Er^{3+}$ exhibits a wide fluorescence bandwidth in a given crystal, it is expected that the amorphous form of the crystalline material will also exhibit a wide fluorescence bandwidth.

Figure 24A:
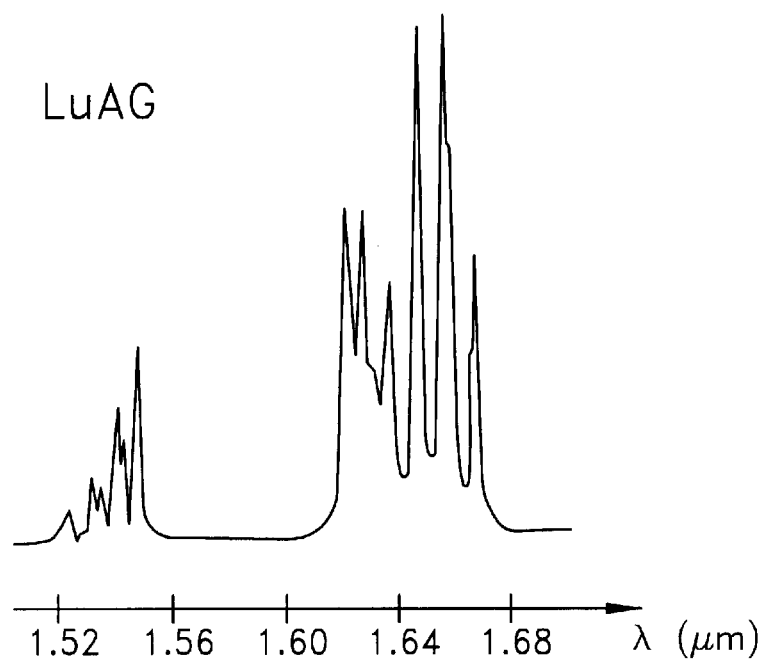
FIG. 24 illustrates a fluorescence spectrum of erbium-doped crystalline aluminum garnet (LuAG).
Figure 24B:
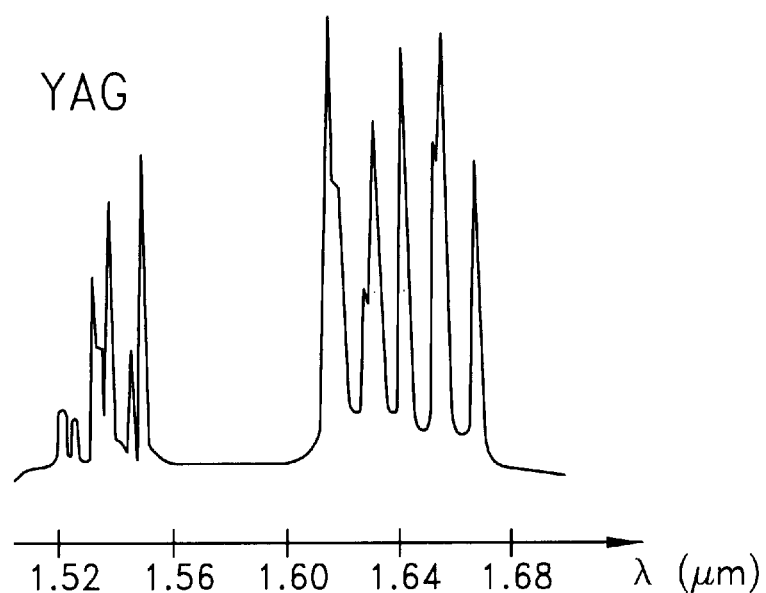

For example, erbium-doped crystalline lutetium aluminum garnet (LuAG) has a fluorescence spectrum illustrated in FIG. 24, as described in A. A. Kaminsky, et al., *Investigation of stimulated emission from $Lu_3Al_5O_{12}$ crystals with $Ho^{3+}$, $Er^{3+}$ and $Tm^{3+}$ ions*, phys. stat. sol. (a), Vol. 18, K31, 1973. The LuAG spectrum exhibits a series of discrete peaks. As in any crystal, each peak corresponds to one or more of the various radiative relaxation transitions between the Stark sub-levels of the $^4I_{13/2}$ level and the $^4I_{15/2}$ level of $Er^{3+}$. The total fluorescence bandwidth, $\Delta\lambda$, of $Er^{3+}$ in this material is defined as being the difference between the longest and the shortest fluorescence wavelength in its fluorescence spectrum. From FIG. 24, for erbium-doped LuAG, these wavelengths are 1,520 nanometers and 1,670 nanometers, respectively, and the bandwidth is thus 150 nanometers. Next, it is assumed that the fluorescence bandwidth of erbium in amorphous LuAG is going to be close to the measured crystal bandwidth $\Delta\lambda$. In other words, it is assumed that the discrete fluorescence spectrum around 1,550 m of erbium in the LuAG crystal is turned into a totally continuous spectrum in the amorphous form of LuAG in a similar manner as found when comparing the characteristics of, for example, erbium-doped crystalline YAG with the characteristics of erbium-doped amorphous YAG.

The foregoing studies have been applied to a large number of erbium-doped crystals to identify a number of materials with potential large fluorescence bandwidths. In particular, the studies were applied to modifications of YAG because it is expected that slight chemical modifications of the YAG host (for example, the substitution of yttrium for lutetium) will not substantially modify the advantageously broadband fluorescence and gain properties of erbium-doped amorphous YAG.

Table IV lists the materials with the largest bandwidths identified thus far. The first column in Table IV lists the chemical formula of the host fiber material, and the second column in Table IV lists the dopants and codopants contained in the host fiber material. The third column in Table IV shows the fluorescence bandwidth $\Delta\lambda$ that is inferred from the published fluorescence spectra using the method described above. The fourth column in Table IV indicates whether ESA is observed in this crystal around 980 nanometers. Table IV reports amorphous materials which are believed to exhibit a wide fluorescence bandwidth around 1,550 nanometers.

TABLE IV

POTENTIAL BROADBAND OXIDES

| Er 3+ doped crystals | Dopant | Fluorescence Bandwidth |
|---|---|---|
| YAG | Er | 160 nm |
| $Y_2SiO_5$ | Er | 160 nm |
| $Y_2SiO_5$ | Er,Yb | |
| $Lu_3Al_5O_{12}$ | Er | 160 nm |
| $Y_3Ga_5O_{12}$ | Er | 140 nm |
| $Ca_2Al_2SiO_7$ | Er | 130 nm |
| $Y_3Sc_2Ga_3O_{12}$ | Er, (Yb, Cr) | 130 nm |
| $Bi_4Ge_3O_{12}$ | Er | 125 nm |
| $GdAlO_3$ | Er | 125 nm |
| $SrY_4(SiO_4)_3O$ | Er | 125 nm |
| $LiYF_4$ | Er | 110 nm |
| $CaF_2$—$YF_3$ | Er | 110 nm |
| $YVO_4$ | Er | 90 nm |
| $LiErYP_4O_{12}$ | Er | 90 nm |

Although Table IV presently provides relatively little information about the pump ESA properties of the crystals studied thus far, Table IV provides the starting point for the search for broadband amorphous hosts for EDFAs.

Although described herein in connection with optical fiber amplifiers, the method for amplifying optical signals in accordance with the present invention can also be performed using integrated optical amplifiers produced from bulk samples of amorphous YAG by applying one of several techniques well known in the art.

What is claimed is:

1. A method for amplifying optical input signals over an extended optical bandwidth, said method comprising:

inputting the optical input signals to an optical waveguide comprising an amorphous $Lu_3Al_5O_{12}$ material doped with a rare earth, said optical input signals including at least a first optical signal having a first wavelength and at least a second optical signal having a second wavelength approximately 160 nanometers greater than said first wavelength; and applying pump light to said optical waveguide to cause said waveguide to provide optical gain to said optical input signals such that at least said first optical signal and said second optical signal are amplified.

2. The method as defined in claim 1, wherein said amorphous $Lu_3Al_5O_{12}$ material is doped with erbium.

3. An optical amplifier which amplifies optical input signals over an extended optical bandwidth, said optical amplifier comprising:

an optical pump source which provides optical pump light; and an optical waveguide comprising an amorphous $Lu_3Al_5O_{12}$ material doped with a rare earth, said optical waveguide optically coupled to receive said optical pump light from said optical pump source, said optical waveguide receiving optical input signals having a plurality of wavelengths, said optical input signals including at least a first optical signal having a first wavelength and at least a second optical signal having a second wavelength approximately 160 nanometers greater than said first wavelength, said pump light having a pump wavelength and intensity at the pump wavelength which causes said optical waveguide to provide optical gain such that at least said first optical signal and said second optical signal are amplified.

4. The optical amplifier as defined in claim 3, wherein said amorphous $Lu_3Al_5O_2$ material is doped with erbium.

* * * * *